(12) United States Patent
Imafuku

(10) Patent No.: US 8,144,998 B2
(45) Date of Patent: Mar. 27, 2012

(54) IMAGE PROCESSING APPARATUS AND METHOD THEREOF

(75) Inventor: Kazuya Imafuku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1139 days.

(21) Appl. No.: 11/954,999

(22) Filed: Dec. 12, 2007

(65) Prior Publication Data

US 2008/0144953 A1 Jun. 19, 2008

(30) Foreign Application Priority Data

Dec. 13, 2006 (JP) .................. 2006-336384

(51) Int. Cl.
*G06K 9/36* (2006.01)
(52) U.S. Cl. ........ 382/232; 382/233; 382/250; 382/251; 382/274; 382/246; 348/384.1
(58) Field of Classification Search .................. 382/232, 382/233, 250, 251, 244, 245, 246, 248, 274, 382/162, 167; 358/426.01, 426.16; 348/384.1, 348/440.1; 345/555
See application file for complete search history.

(56) References Cited

U.S. PATENT DOCUMENTS

| | | | | |
|---|---|---|---|---|
| 5,650,861 A | * | 7/1997 | Nakajima et al. | 382/239 |
| 7,860,339 B2 | * | 12/2010 | Yamashita et al. | 382/274 |
| 2002/0171855 A1 | * | 11/2002 | Edge | 358/1.9 |
| 2005/0276500 A1 | * | 12/2005 | Nakayama et al. | 382/251 |
| 2007/0036224 A1 | * | 2/2007 | Srinivasan et al. | 375/240.18 |

FOREIGN PATENT DOCUMENTS

| | | |
|---|---|---|
| JP | 2001-145107 | 5/2001 |
| JP | 2005-053009 | 3/2005 |

* cited by examiner

*Primary Examiner* — Samir Ahmed
*Assistant Examiner* — Ali Bayat
(74) *Attorney, Agent, or Firm* — Fitzpatrick, Cella, Harper & Scinto

(57) ABSTRACT

The present invention relates to an image processing method and apparatus for processing compressed image generated by segmenting image data into a plurality of MCUs and using a compression method in which a frequency transformation is applied to each MCU. In a case that the compressed image is decoded, each MCU is classified according to the frequency coefficients therein, and color separated data is generated for each MCU based on the decoded data resulting from the decoding and the results of the MCU classification.

15 Claims, 26 Drawing Sheets

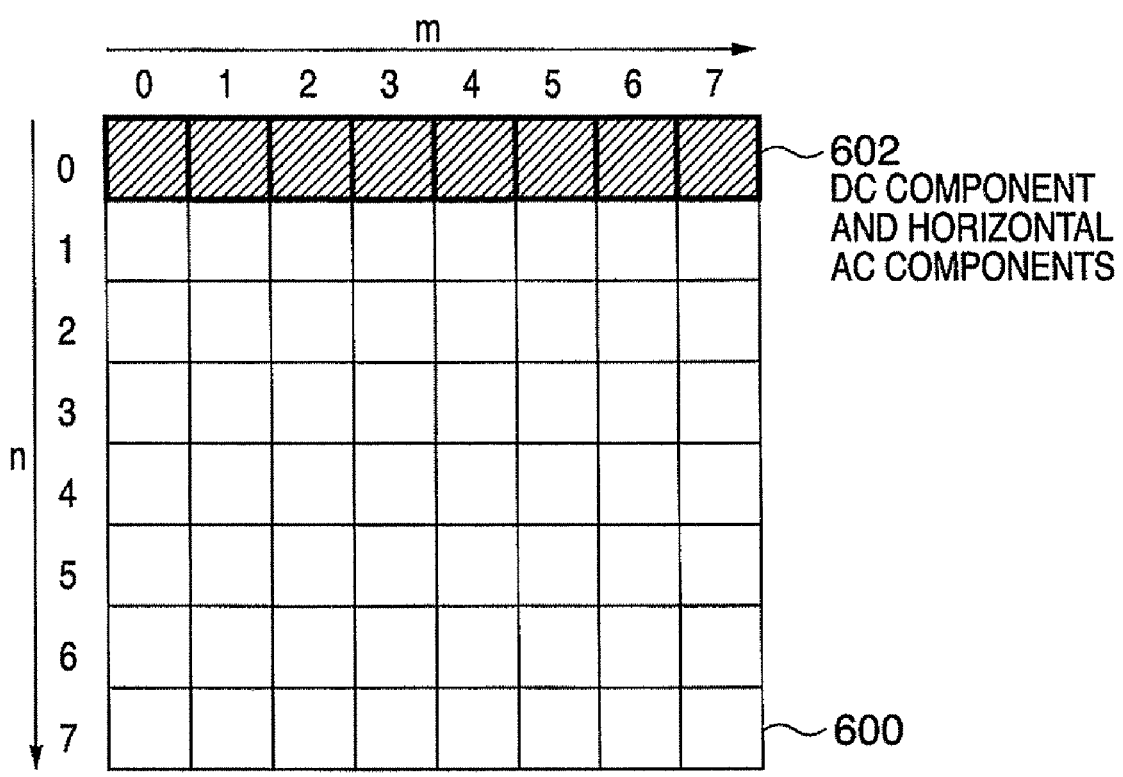

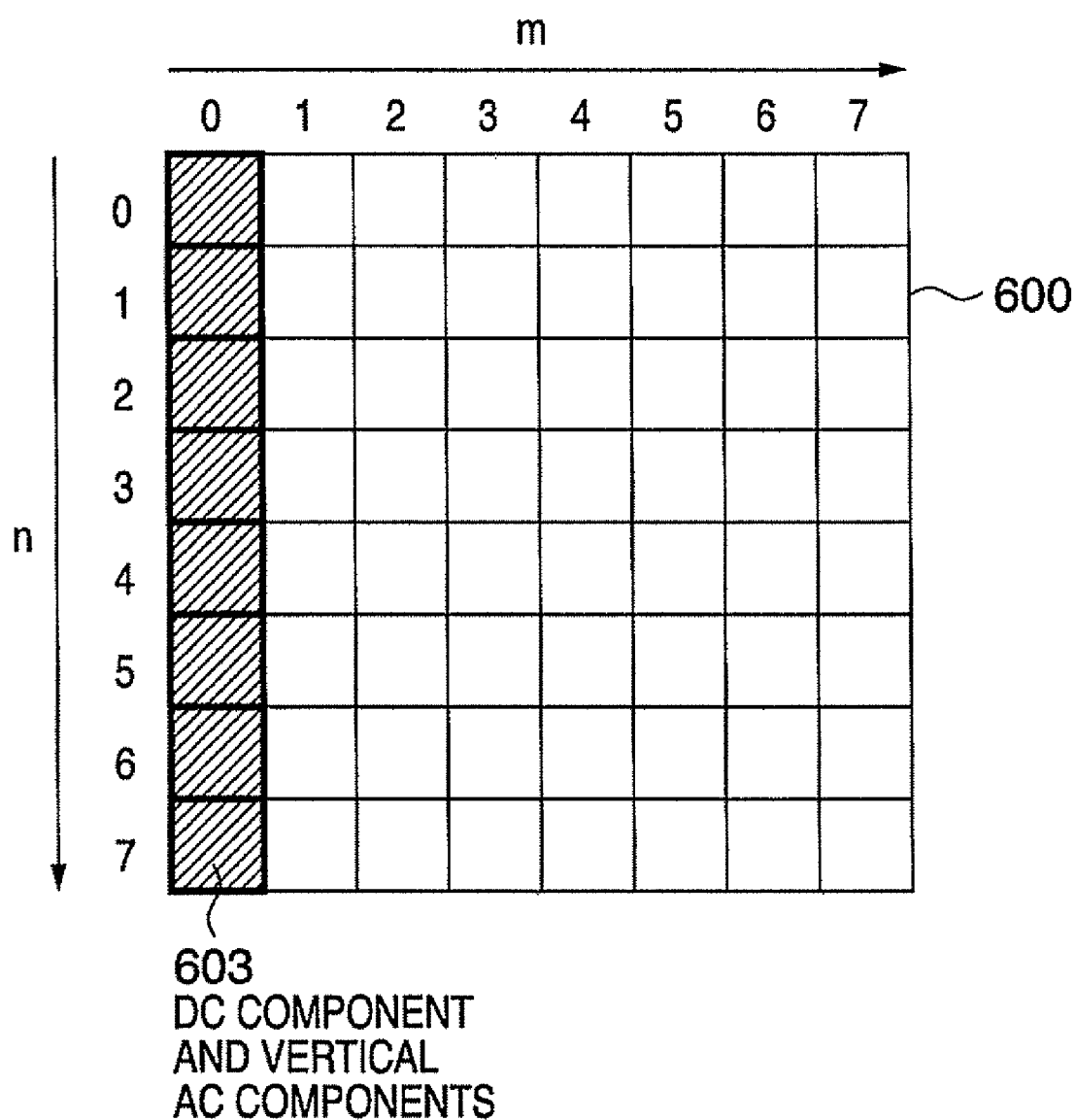

8×8 PIXEL BLOCK (MCU)

8×8 PIXEL BLOCK (MCU)

8×8 PIXEL BLOCK (MCU)

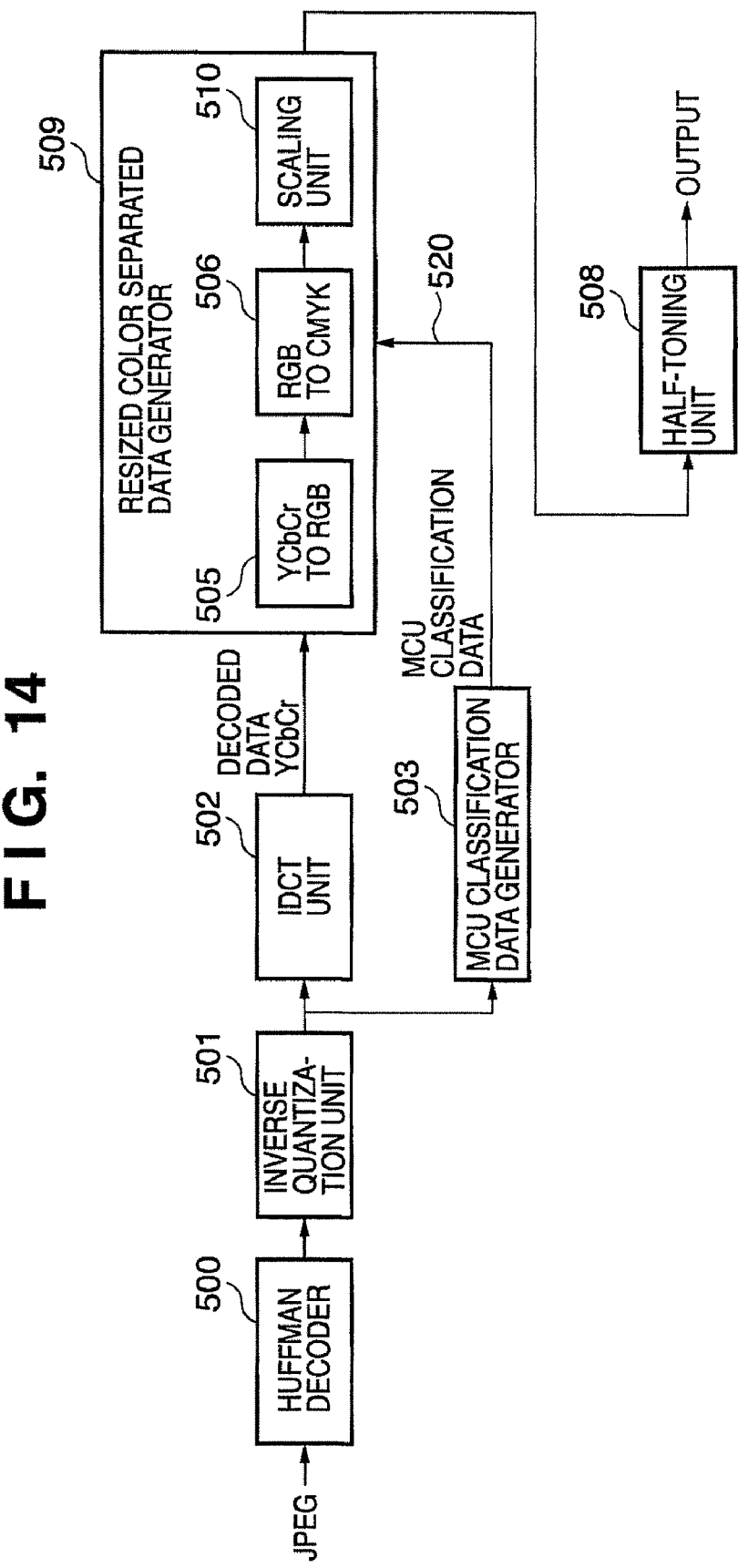
F I G. 14

IMAGE PROCESSING APPARATUS AND METHOD THEREOF

BACKGROUND OF THE INVENTION

1. Field of the Invention

The present invention relates to an image processing apparatus and method for processing image data compressed using a frequency transformation such as a DCT (Discrete Cosine Transform).

2. Description of the Related Art

In recent years, as the use of digital cameras has become widespread, printing digital camera-captured image data using printers has become more common. As a result, various printing methods have appeared, including direct-from-camera printing in which the digital camera is directly connected to the printer and memory card printing in which a memory card of a digital camera is attached to a printer and the image data stored therein is printed. In these technologies, the printer receives image data from the digital camera or memory card, decodes the image data to generate print data, and prints.

Since the resources (calculation power of CPU, memory capacity) of printers which process image data in this way are much more limited in comparison to the resources of PCs, the ability to perform the processing to generate print data efficiently is a requirement for systems which perform direct printing.

Aside from this trend for direct printing, the advancement of digital camera technology has accelerated, and the number of pixels in digital camera imaging has increased sharply. To suppress the size of the image data without loss of image quality, image data is processed using a color image compression format based on the DCT when saved on the memory card. The standard example among these formats is JPEG. In JPEG, the image data is divided into a plurality of blocks called MCUs (Minimum Coded Units), and each MCU undergoes DCT conversion. A high degree of compression is then realized by making use of the low sensitivity to high frequency signals which characterizes human vision and eliminating the high-frequency components in the DCT coefficients (frequency coefficients). However, encoding to and decoding from the JPEG format imparts a large processing load.

As a technique for increasing the efficiency of processing which makes use of JPEG characteristics, Japanese Patent Laid-Open No. 2001-145107 proposes a technique for increasing the speed of baseline JPEG compression processing by taking frequency characteristics of the MCU into consideration. In this technique, the image data is divided into MCUs, the MCUs are classified into uniform color MCU and non-uniform color MCUs. The uniform color MCUs are then encoded by finding only DC coefficients using a simple calculation, and the non-uniform color MCUs are encoded normally. Thus, techniques of this type for reducing the load of encoding and decoding by paying close attention to the characteristics of the DCT used in JPEG have already been proposed. However, these techniques are limited to the efficient treatment of MCUs of uniform color.

Besides decoding the JPEG coded image data or the like, the printer must also generate print data which can be printed by the printer from the decoded color image data. The following describes a technique for efficiently generating print data from the decoded color image data.

Generally, color image data is expressed using a color space, in such as CRT, which differs from the color space of a printer. Due to the diversity of color spaces for expressing color image data, after a first conversion into a standard color space it is necessary to resolve the data into the colors of the printer-specific coloring materials. Since an enormous amount of processing is required to generate the color data for the printer-specific coloring materials, techniques for efficiently performing this processing have been proposed.

Japanese Patent Laid-Open No. 2005-53009 proposes a technique for suppressing the processing speed reduction resulting from color space conversion in performing color conversion process, color correction and print processing with colors conversion. In this technique, input data are stored in correspondence with device-dependent data, and the stored data are used as a color processing cache. The cache region is structured to allow storage of a plurality of items of cache data, and a cache data table is searched to judge whether the input data and color processing result for given input data has already been cached in combination. When the combination has been cached in the cache data table, the cached data can be used and the color processing of the input data can be omitted. When the combination has not been cached in the cache data table, color processing is implemented on the input data, and the result is stored in an empty region of the cache region or written over a region that is in use. This process allows a reduction in the amount of processing required for the color processing. Moreover, as the amount of cached data increases, the cache hit rate generally increases.

However, the above-described technique has the following disadvantage. Since it is necessary to store a plurality of items of cache data in the cache data table, the cost of the cache region increases with the size of the table. Also, as the size of the table increases, there is a corresponding increase in the amount of time taken to search the table.

Thus, although techniques have been already proposed for reducing the processing load for particular image formats frequently used by printer and for improving the efficiency of color processing when generating print data from the image data, there is still room for improvement.

SUMMARY OF THE INVENTION

An aspect of the present invention is to eliminate the above-mentioned conventional problems.

A feature of the present invention is to further accelerate the color processing for color image data compressed using a frequency transformation, such as DCT.

According to the present invention, there is provided an image processing apparatus for processing compressed image data generated by segmenting image data into blocks and using a compression method which applies a frequency transformation to each block, the image processing apparatus comprising:

a decoder configured to decode the compressed image data and output decoded data;

a block classification unit configured to classify blocks according to frequency coefficients in the blocks decoded by the decoder; and a color separated data generator configured to generate color separated data in block units based on the decoded data decoded by the decoder and a result of classification by the block classification unit.

According to the present invention, there is provided an image processing method for processing inputted compressed image data generated by segmenting image data into blocks and using a compression method to apply a frequency transformation to each block, the image processing method comprising the steps of:

decoding the compressed image and outputting decoded data;

classifying blocks according to frequency coefficients in the blocks decoded in the decoding step; and generating color separated data in block units based on the decoded data and a result of classification in the classifying step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A to FIG. 6E depict views illustrating DCT coefficients obtained using an inverse quantization unit of the exemplary embodiments;

FIG. 14 is a block diagram explaining color space conversion processing of a second exemplary embodiment of the present invention;

DESCRIPTION OF THE EMBODIMENTS

Numerous embodiments of the present invention will now herein be described below in detail with reference to the accompanying drawings. The following embodiments are not intended to limit the claims of the present invention and not all combinations of features described in the embodiments are essential to the solving means of the present invention. Note that hereinafter for the sake of convenience, the function of a printer generating print data based on received image data and subsequently printing will be referred to as "direct printing".

First, an overall concept of an image processing system, a hardware construction concept, and a software construction concept common to the following exemplary embodiments are described.

Figure 1:
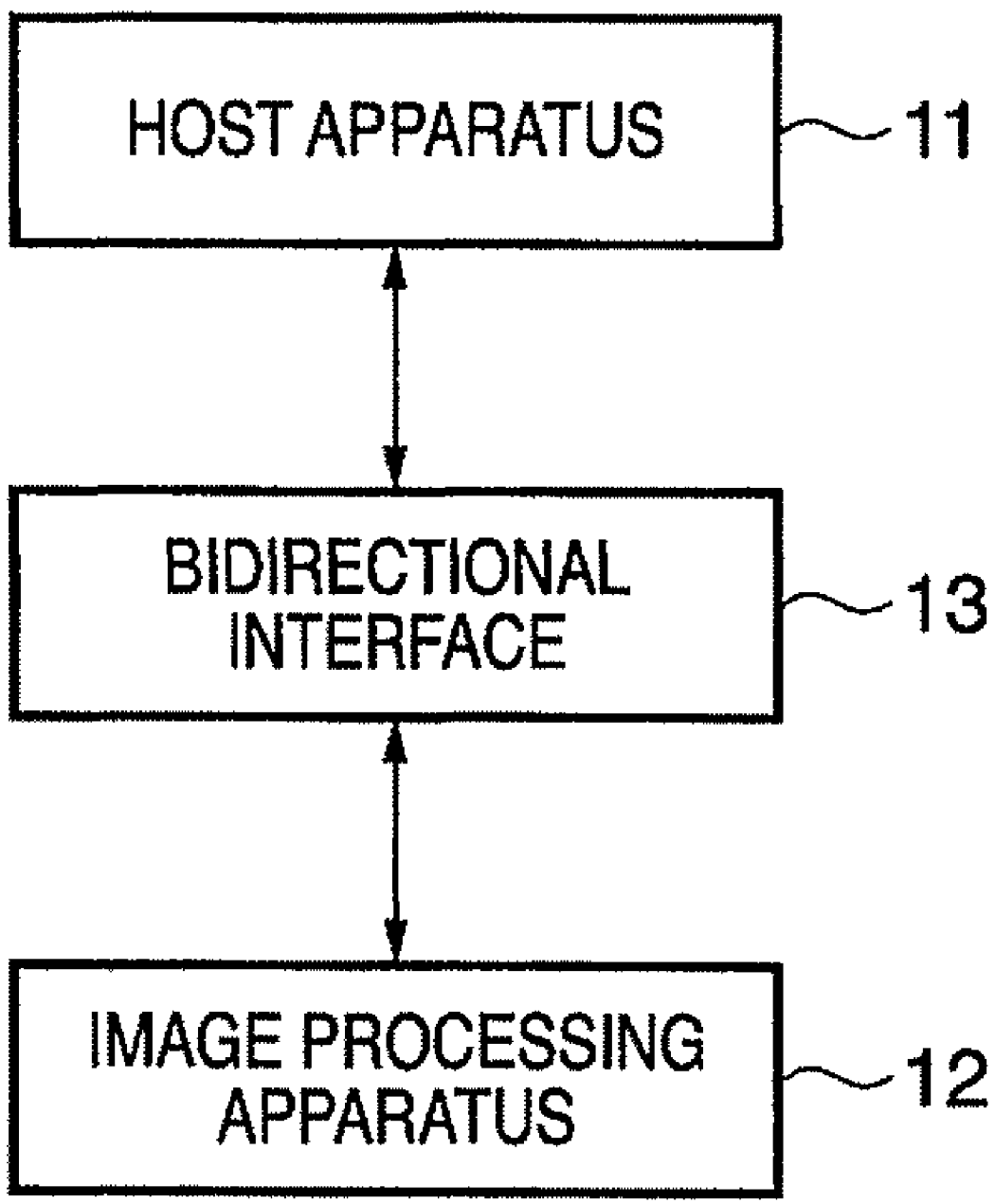
FIG. 1 is a block diagram showing a schematic construction of the print system (image processing system) common to the exemplary embodiments of the present invention.

FIG. 1 is a block diagram showing a schematic construction of a print system (image processing system) common to the exemplary embodiments of the present invention.

The print system includes a host apparatus 11 that is a PC or the like and an image processing apparatus 12 that is a printer or the like, connected via a bidirectional interface 13.

The following describes the concept of the hardware construction of the image processing apparatus 12.

Figure 2:
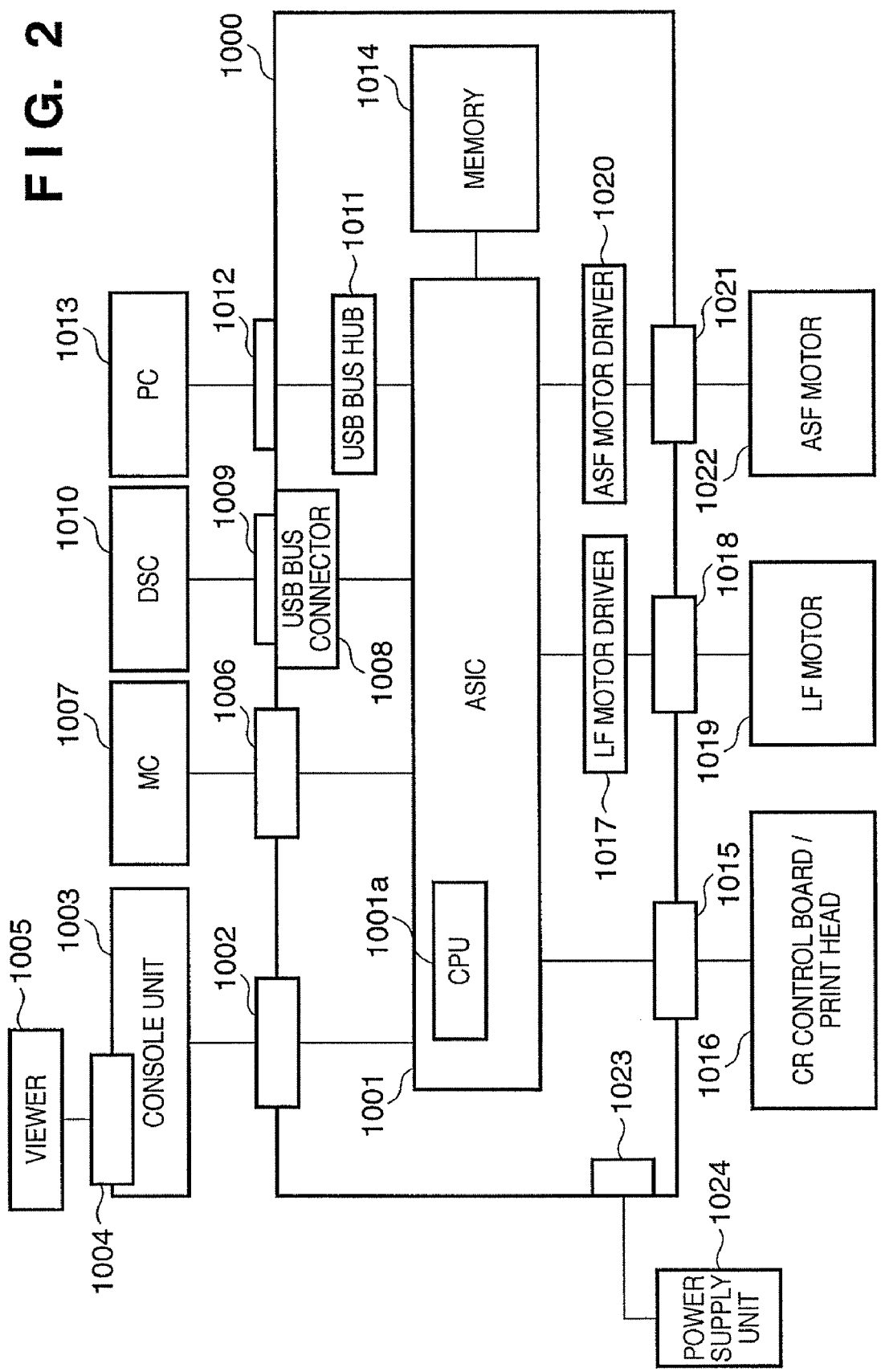
FIG. 2 is a block diagram showing a schematic of hardware for an image processing apparatus that forms the print system of the exemplary embodiments.

FIG. 2 is a block diagram showing a schematic construction of hardware of the image processing apparatus 12 that forms the print system of the exemplary embodiments.

As shown in FIG. 2, reference numeral 1000 denotes a control board. ASIC 1001 includes an interfacing unit (not shown in the drawings) for controlling the interface of various units which connect to the ASIC 1001, and a CPU 1001a for executing various processing, such as image data generation and the like. A connector 1002 connects the control board 1000 and a console unit 1003. Using the console unit 1003, a user is able to perform operations such as setting various print setting information, looking at and specifying images stored in a memory card (MC) 1007, specifying the start of printing, cancelling the printing, and the like. A connector 1004 connects the console unit 1003 and a viewer 1005. The viewer 1005 displays images stored in the memory card 1007, GUI menus, various error messages, and the like. A connector 1006 connects the memory card 1007 and the control board 1000, and the ASIC 1001 is capable of directly reading image data from the memory card 1007 and printing.

A DSC USB bus connector 1008 is a USB bus connector for connecting a digital camera (DSC) 1010 to the control board 1000, and a connector 1009 is for connecting the digital camera 1010. The digital camera 1010 is constructed to allow output of image data and print setting information stored in the internal memory to the image processing apparatus 12. Note that various constructions may be employed for the digital camera 1010. For instance, a memory may be included as an internal unit or a slot for installing a removable memory may be provided. This arrangement allows the image data in the digital camera 1010 to be processed in accordance with the print setting information set in the digital camera 1010, thereby enabling the direct printing.

A USB bus hub 1017 passes data from the PC 1013 connected via the connector 1012 to the ASIC 1001 in a case that image data from the PC 1013 is printed. A memory 1014 includes a program memory for storing control programs and the like for the CPU 1001*a* of the ASIC 1001. Also included are a RAM area for storing programs during execution, and a work memory area for storing data such as image data, print setting information and various later-described flags and variables.

A connector 1015 connects a CR (carriage) control board and a print head 1016 to the control board 1000. Reference numeral 1017 denotes a LF (line feed) motor driver, a reference numeral 1018 denotes a connector that connects a LF motor 1019 to the LF motor driver 1017. In the same way, reference numeral 1020 denotes an ASF (auto sheet feed) motor driver, and reference numeral 1021 denotes a connector connecting the ASF motor 1022 to the ASF motor driver 1020. A DC voltage is inputted by a power supply unit 1024 via a power connector 1023. The power supply unit 1024 may be an AC adaptor for generating a DC voltage from a battery or commercial power supply.

The following describes the concept of the software construction of the image processing apparatus 12 of the exemplary embodiments. Here, the print function is described.

Figure 3:
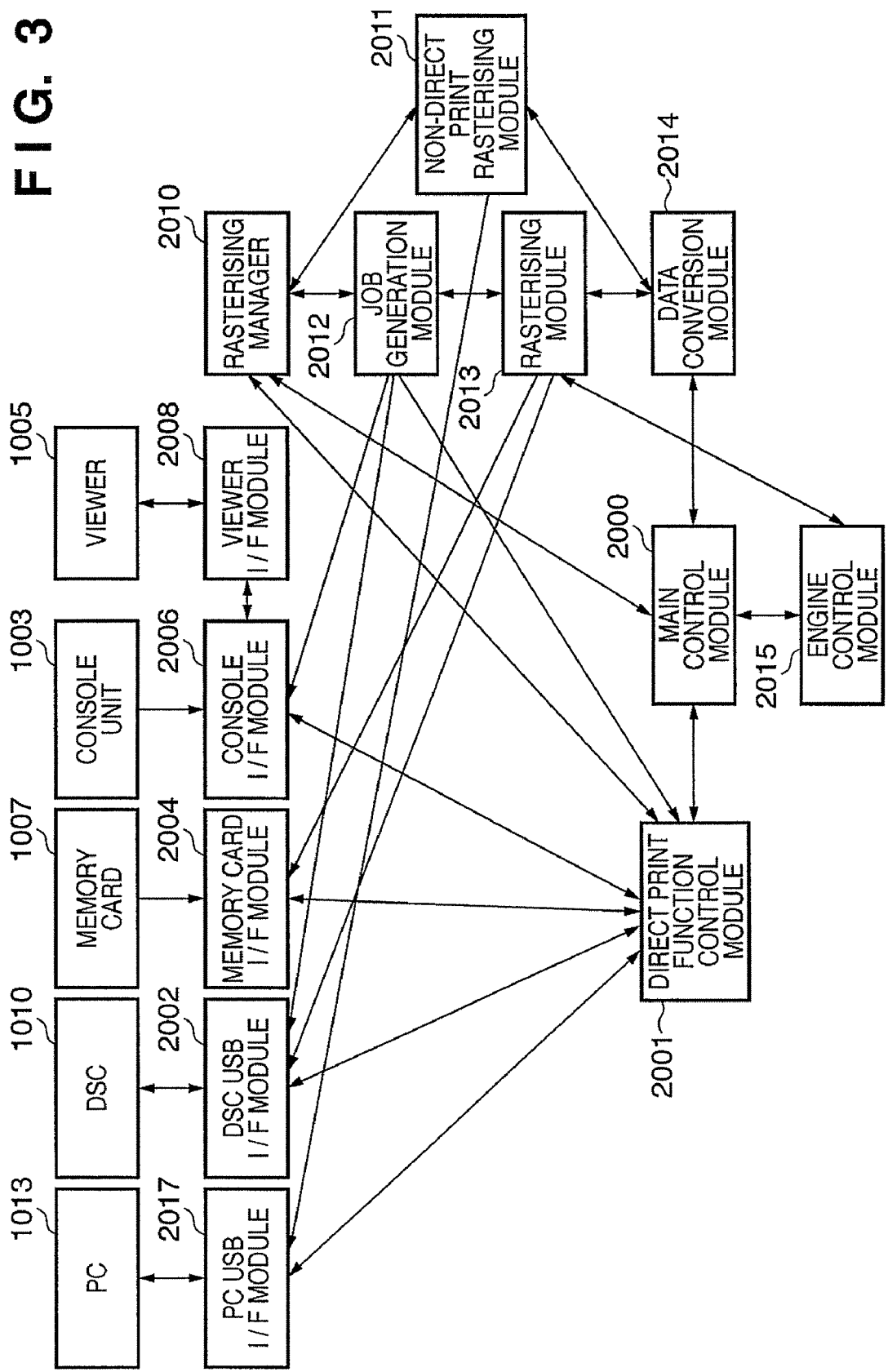
FIG. 3 shows a modular construction of software used for the print function of the image processing apparatus of the exemplary embodiments.

FIG. 3 shows a modular construction of software used for the print function of the image processing apparatus 12 of the exemplary embodiments. The following describes the print processing with reference to FIG. 3. Note that in the cases described here, the image data is read from the memory card 1007 and printed, the data is received from the PC 1013 and printed, or the data is received from the digital camera 1010 and printed. Note also that each module, rasteriser, and interface control module shown in FIG. 3 is realized by the CPU 1001*a* using a program stored in the memory 1014.

First, the case in which the image data is inputted from the memory card 1007 and printed is described.

A direct print function control module 2001 connects to a DSC I/F module 2002, a memory card I/F module 2004, a PC USB I/F module 2017, and receives information about the connection states of the DSC 1010, the memory card 1007, and the PC 1013, respectively. The information about the connection states is sent via a console I/F module 2006 to the console unit 1003 and displayed by the console unit 1003. The direct print function control module 2001 judges whether a direct print between the memory card 1007 or the digital camera 1010 and the control board 1000 is currently possible and displays a user settings menu which includes settings which are specifiable by the user via the console unit 1003. The console I/F module 2006 receives various print-related settings such as paper settings irrespective of the connection states of the DSC 1010 and the memory card 1007, and stores current print setting information. A menu screen or the like for specifying the print setting method is displayed on the viewer 100S. The console I/F module 2006 communicates with a viewer I/F module 2008, and supplies key operation information of the console unit 1003. The console I/F module 2006 further supplies connection state information regarding the DSC 1010, the memory card 1007, and the PC 1013. Then, based on the supplied information, menu screens showing available settings and image data from the connected device are displayed on the viewer 1005.

In a case that the memory card 1007 is connected, a user makes use of the console unit 1003 and the viewer 1005 to view image data stored in the memory card 1007, specify the image data to be printed, and instruct that printing is to start. When the user is to print image data of the memory card 1007, pressing a print start key of the console unit 1003 causes the console I/F module 2006 to issue a print start request to the direct print function control module 2001. Upon receiving the print start request, the direct print function control module 2001 notifies a main control module 2000 of the print start request. The direct print function control module 2001 instructs the DSC USB I/F module 2002 and the PC USB I/F module 2017 to inhibit reception of data from the DSC 1010 and the PC 1013, i.e. from components other than the memory card 1007. When these instruction have been received and the system is entirely devoted to printing of the image data of the memory card 1007, the main control module 2000 permits the direct print function control module 2001 to switch to direct print processing. On receiving this permission, the direct print function control module 2001 gives a print instruction to a rasterising manager 2010.

The rasterising manager 2010 selects a rasterising module appropriate for current print mode and causes execution of raster processing. For instance, in a case that print data generated by the PC 1013 is to be received from the PC 1013 and printed, the data received from the PC 1013 is itself the print data. In contrast, when image data from the DSC 1010 or the memory card 1007 is to be printed, a rasterising module 2013 has to generate print data. Hence, in a case that the generated print data is to be received from the PC 1013 and printed, the rasterising manager 2010 selects a non-direct print rasterising module 2011 and causes processing of the print data from the PC 1013. Further, in a case that the image data from the DSC 1010 or memory card 1007 is to be received and printed, the rasterising manager 2010 causes processing by a job generation module 2012 and the rasterising module 2013.

The job generation module 2012 receives print processing instructions from the rasterising manager 2010. The job generation module 2012 asks the direct print function control module 2001 whether the direct print is a direct print from the memory card 1007 or a direct print from the digital camera 1010. If notified that the direct print is a direct print from the memory card 1007, the job generation module 2012 acquires the print setting information set by the user from the console I/F module 2006, and generates a job. The job generation module 2012 gives a print processing instruction to the rasterising module 2013.

The rasterising module 2013 generates print data based on the job information. This job information includes instructions about the paper size and type, and the type of printing method. Possible printing methods include n-in-1 printing and index printing. The job information further includes instructions relating to printing position and various types of image correction, information relating to image files specified for printing, and information indicating whether the direct printing is instructed from the memory card 1007 or the digital camera 1010.

The rasterising module 2013 interprets the job information, determines an operation mode of an engine unit based on a type of paper and print quality, and communicates information concerning the operation mode to an engine control module 2015. Then in accordance with the paper size and printing method, the rasterising module 2013 generates layout information for determining the size of an image and a position in a sheet and assigning the image to the position of the sheet, and generates print data using the information relating to the image file specified for printing. A data conversion module 2014 converts the print data generated by the rasterising module 2013 and the non-direct print rasterising module 2011 to a data format suitable for reception by the printer engine unit.

Figure 4:
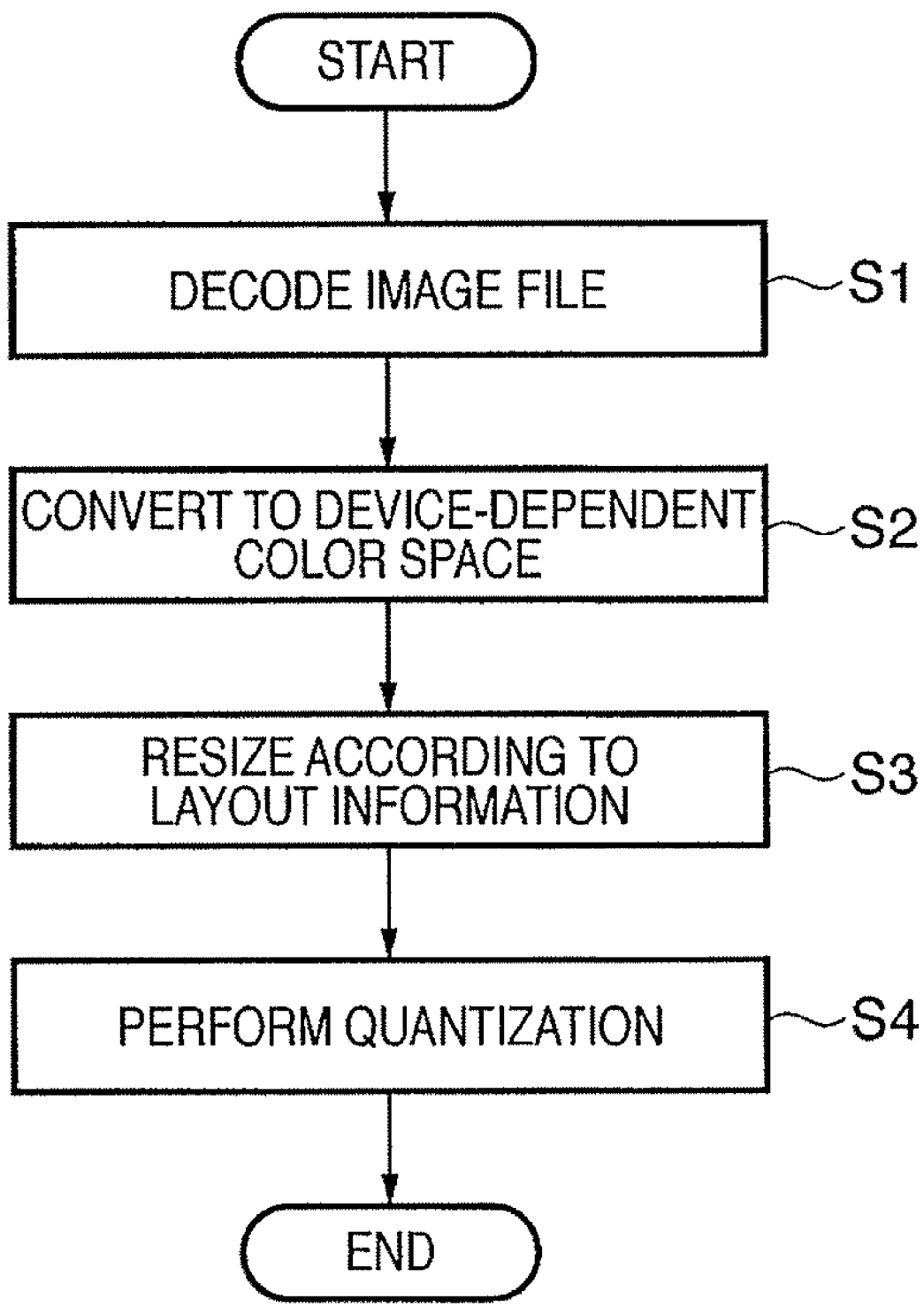
FIG. 4 is a flowchart describing processing for generating print data by a data conversion module of the exemplary embodiments.

FIG. 4 is a flowchart describing processing for generating print data using the data conversion module 2014 of the exemplary embodiments. Note that the program for executing this processing is stored in the memory 1014 and executed under the control of the CPU 1001*a*.

First, in step S1, the image file specified for printing is read and decoded. Next, in step S2, the color space of the image data resulting from the decoding is converted to a color space specific to the image processing apparatus 12. Next, in step S3, the image data is resized in accordance with the layout information. Lastly, in step S4, pixel data of the resized image data is quantized (half-toning). Note that the quantization depends on the format of the data processed by the image processing apparatus 12. For instance, in a case that the image processing apparatus 12 executes printing using binary data, the data is converted to binary data. In a case that the image processing apparatus prints based on multivalued data (for printing using ink shading, or printing using large and small dots), the data is converted to multivalued data. The above describes the concept of the print data generation procedure by the data conversion module 2014 of the exemplary embodiment.

Further, the rasterising module 2013 issues, as required, requests such as paper supply and discharge requests, feed requests, and print requests to the engine control module 2015, and proceeds through the processing in synchronism with an operation of the engine control module, while exchanging messages with the engine control module 2015. In a case of direct printing from the memory card 1007, the image file specified for printing is accessed via the memory card I/F module 2004. Further, in a case of direct printing from the digital camera 1010, the image file in the digital camera 1010 is accessed via the DSC USP I/F module 2002.

The data conversion module 2014 converts print data generated by the rasterising module 2013 or the non-direct print rasterising module 2011 into data of a data format suitable for reception by the printer engine unit (not shown in the drawings) of the image processing apparatus 12. Then, whenever a predetermined amount of converted data has been prepared, the data conversion module 2014 notifies the engine control module 2015 via the main control module 2000. Taking into account the operation mode of the printer engine unit, the engine control module 2015 passed the data converted by the data conversion module 214 to the printer engine unit, and causes the printer engine unit to perform print processing.

The following describes the processing in the case that image data is received from the digital camera 1010 and direct printing is performed.

The direct print function control module 2001 performs processing in a similar manner to the direct printing in which image data is printed from the memory card 1007.

When the digital camera 1010 is connected, a user makes use of functions provided in the digital camera 1010 to look at images stored in a memory unit of the digital camera 1010, specify the image for printing and the print settings, and instruct that printing should begin. In the case of direct printing from the digital camera 1010, when a print start key of the digital camera 1010 is pressed, a print start request is issued to the direct print function control module 2001 from the DSC USB I/F module 2002. Upon receiving the print start request, the direct print function control module 2001 notifies the main control module 2000 of the print start request. The main control module 2000 instructs the memory card I/F module 2004 and the PC USB I/F module 2017 to inhibit reception of data from the memory card 1007 and the PC 1013, i.e. from components other than the digital camera 1010. When these instructions have been received and the system is entirely devoted to printing image data from the digital camera 1010, the main control module 2000 permits the direct print function control module 2001 to switch to the direct print processing.

In this case, operations of the direct print function control module 2001 are similar to the operations performed in the case of the direct print of image data from the memory card 1007.

The job generation module 2012 receives print processing instructions from the rasterising manager 2010. The job generation module 2012 asks the direct print function control module 2001 whether the direct print is a direct print of image data from the memory card 1007 or a direct print of image data from the digital camera 1010. If the result indicates the direct print of image data from the digital camera 1010, the job generation module 2012 acquires the print setting information set by the user via the DSC USB I/F module 2002 to generate a print job. The job generation module 2012 gives a print processing instruction to the rasterising module 2013. The operations of the rasterising module 2013 at this point are substantially the same as the operations in the direct print of image data from the memory card 1007. The only difference is that, in the latter case, the desired image file is accessed via the DSC USB I/F module 2002. Further, in the processing by the data conversion module 2014 and the engine control module 2015, the operations are similar to the operations performed in the direct print of image data from the memory card 1007. The above has described the concept of the software construction.

The feature of the exemplary embodiments relates to the print data generation processing executed by the rasterising module 2013 in FIG. 3. In particular, the feature relates to processing for decoding color image data that has been compressed using the DCT and converting the color space of the decoded image data to the color space specific to a particular device.

The following describes a first exemplary embodiment, paying close attention to the print data generation processing performed on the color image data compressed using the DOCT. For the sake of convenience, an example is described in which the color image data compressed using the DCT is JPEG data.

First Embodiment

In the first embodiment, the object is to speedily generate color separated data resulting by the conversion from the JPEG data into the device-specific color space.

As described above with reference to FIG. 4, the color separated data resulting by the conversion from the JPEG data into the device-specific color space is generated in accordance with the following steps.

(1) The specified image file is read and image data of the image file is decoded.

(2) The color space of the decoded image data is converted into a device-specific color space.

Figure 5:
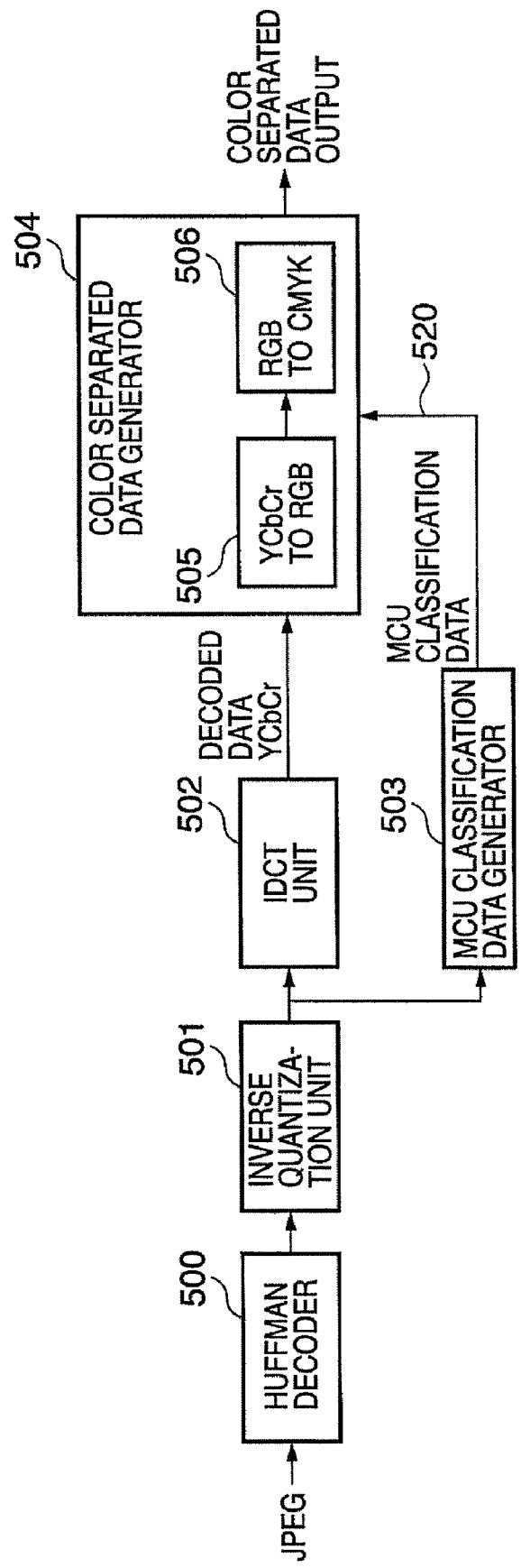
FIG. 5 is a block diagram explaining color space conversion processing of the exemplary embodiments.

FIG. 5 is a block diagram explaining color space conversion processing of the exemplary embodiments. This processing corresponds to steps S1 and S2 of in the flowchart of FIG. 4.

First, the JPEG data received from the memory card 1007, the digital camera 1010, or the PC 1013 is segmented into AC components and DC components and Huffman decoded by a Huffman decoder 500. This allows the quantized DCT coefficient (quantized frequency coefficient) data for each MCU to be obtained. Next, the quantized DCT coefficient data outputted from the Huffman decoder 500 undergoes inverse quantization by an inverse quantization unit 501 to obtain the DCT coefficient data for each MCU. The DCT coefficient data for each MCU then undergoes inverse DCT conversion by an inverse DCT unit 502. The resulting output is the decoded JPEG data. The color space of the decoded JPEG data is not limited to a particular format. However, DCF (Design rule for Camera File system) version 1.0, which is a camera file system guideline, indicates that the data format should be YCbCr. On this basis, here it is assumed that the decoded JPEG data is outputted as YCbCr data.

The DCT coefficient data for each MCU, which has been generated by the inverse quantization unit 501 is also simultaneously supplied to an MCU classification data generator 503. The MCU classification data generator 503 analyzes the DCT coefficient data, classifies the MCUs into four categories, and outputs MCU classification data.

The following describes the classification method with reference to FIG. 6A to FIG. 6E and FIG. 7A to FIG. 7D.

FIG. 6A to FIG. 6E depict views illustrating DCT coefficients obtained using an inverse quantization unit of the exemplary embodiments. In the drawings, "m" and "n" respectively represent horizontal frequency components (m=0 to m=7) and the vertical frequency components (n=0 to n=7).

FIG. 7A to FIG. 7D depict views illustrating pixel values obtained using the IDCT unit 502, and "x" and "y" in the drawings designate pixel positions in the MCU.

Figure 6A:
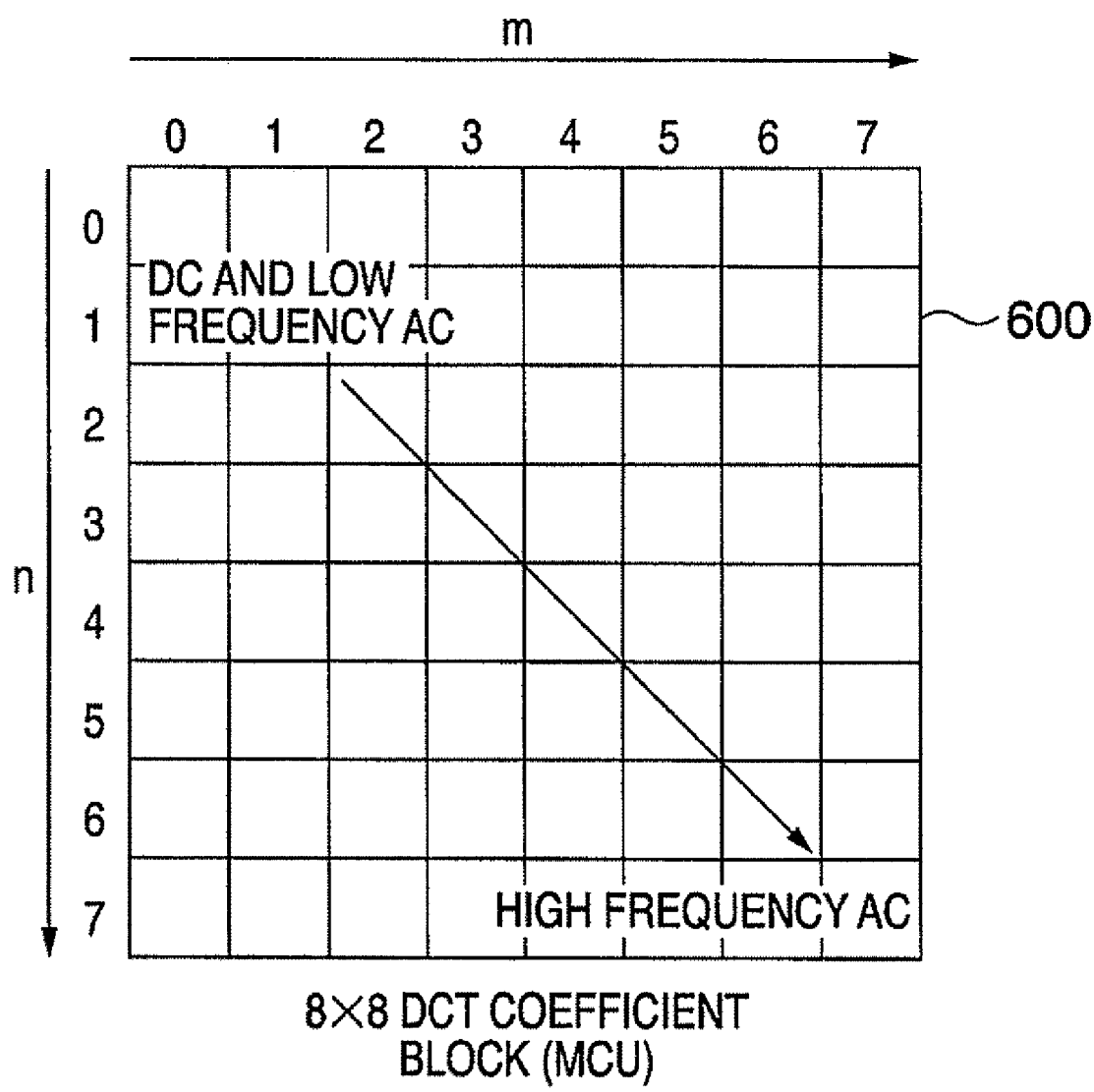

FIG. 6A shows a DCT coefficient block 600 in a given MCU, as generated by the inverse quantization unit 501. Since the MCU is constructed from an 8×8 set of pixels, an 8×8 set of components is obtained for the corresponding DCT coefficients.

Formula (1) below is the conversion formula used by the IDCT unit 502, and "m" and "n" in the formula correspond to the "m" and "n" in FIG. 6A to FIG. 6E.

$$S_{x,y} = \frac{1}{4} \sum_{m=0}^{7} \sum_{n=0}^{7} C_m C_n S_{mn} \cos \frac{(2x+1)m\pi}{16} \cos \frac{(2y+1)n\pi}{16}$$ [Formula 1]

$C_m, C_n = (1/\sqrt{2})$ (when $m, n=0$)

$C_m, C_n = 1$ (otherwise)

Here, $C_m$ is the conversion coefficient for when the horizontal frequency coefficient is "m", and $C_n$ is the conversion coefficient for when the vertical frequency coefficient is "n". Further, $S_{mn}$ is the frequency component value at the frequency component (m,n), and $S_{x,y}$ is the pixel value at the position (x,y) in the corresponding MCU obtained from the IDCT unit 502.

Figure 6B:
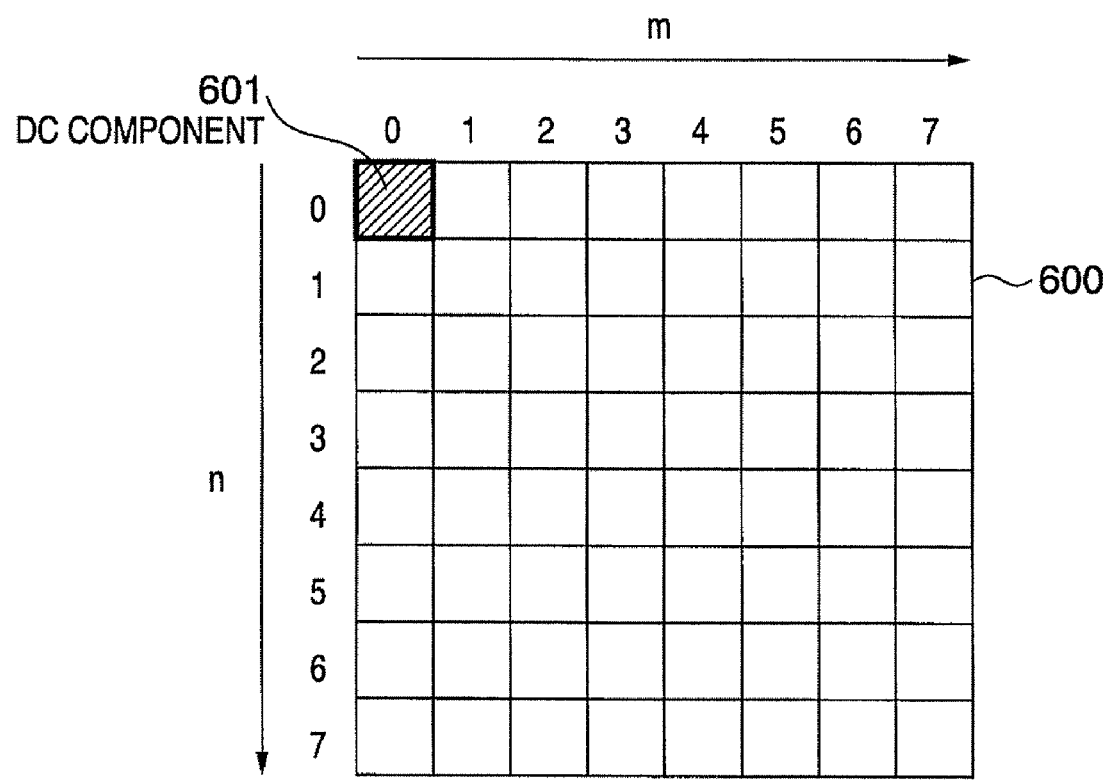

As is clear from the above-described formula (1), the coefficient indicated by reference numeral 601 in FIG. 6B, i.e. the coefficient for (m,n)=(0, 0), is the DC component. The coefficients indicated by reference numeral 602 in FIG. 6C, i.e. the group of coefficients for which n=0, have DC component and horizontal AC components. Similarly, the coefficients indicated by reference numeral 603 in FIG. 6D, i.e. the group of coefficients for which m=0, have a DC component and vertical AC components. From the above it is possible to state the following.

Figure 7A:
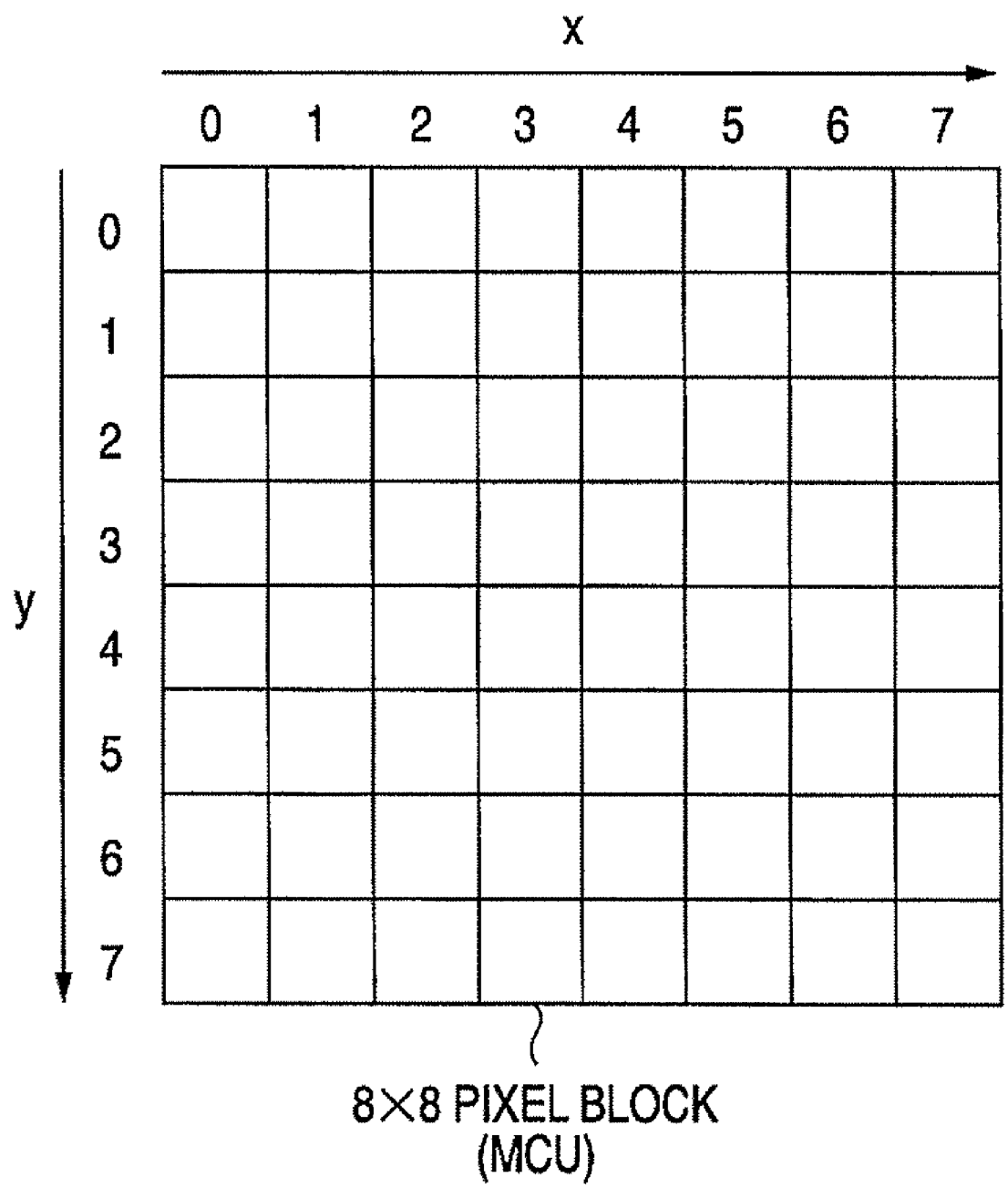
FIG. 7A to FIG. 7D depict views illustrating pixel values obtained using an IDCT.

If the DCT coefficients of a given MCU include only the DC component 601, as shown in FIG. 6B, the MCU can be understood to have pixels which are all of a single color, as shown in FIG. 7A. For the sake of convenience, in the following description, a data pattern composed of pixels which are all of a single color, as shown in FIG. 7A, is referred to as "pattern A".

Figure 7B:
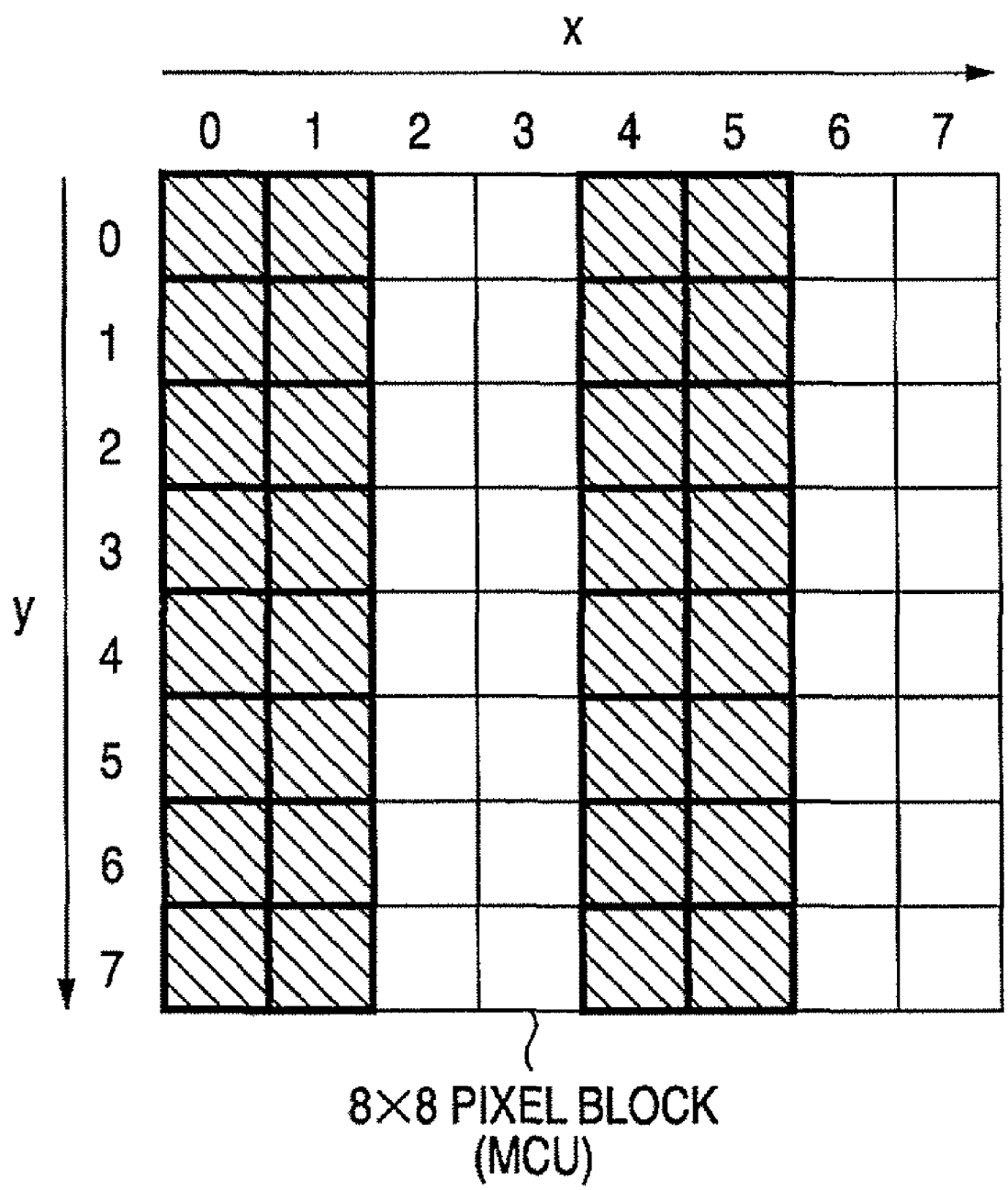

If the DCT coefficients of a given MCU include a DC component and horizontal AC components, as indicated by reference numeral 602 in FIG. 6C, the given MCU can be understood to include a pattern of vertical stripes, as shown in FIG. 7B. In other words, any eight consecutive pixels in the y-direction in the MCU have the same pixel value. For the sake of convenience, in the following description, a data pattern in which any eight consecutive pixels in the y-direction have the same pixel value, as shown in FIG. 7B, is referred to as "pattern B".

Figure 7C:
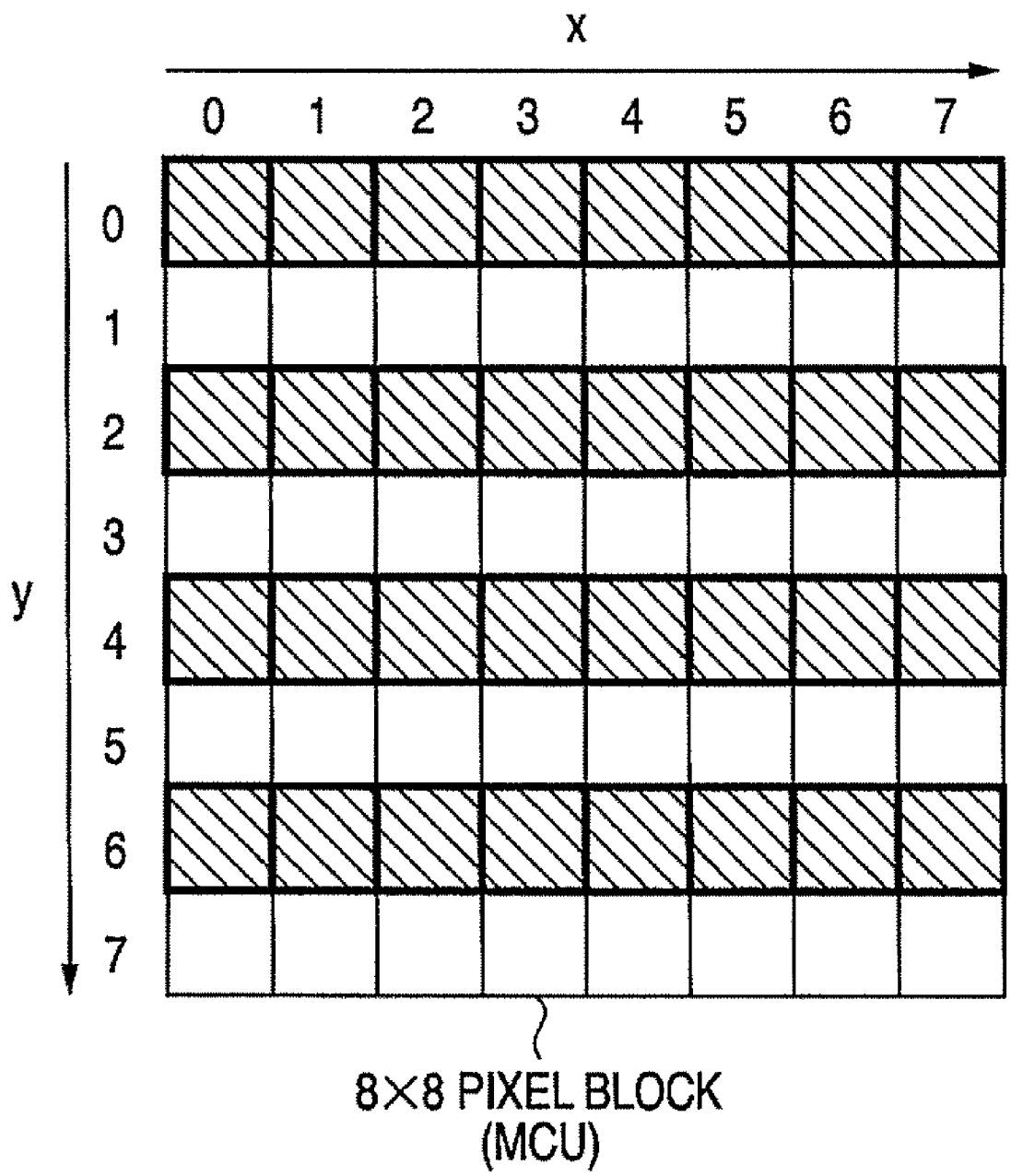

Moreover, if the DCT coefficients of a given MCU include a DC component and vertical AC components, as indicated by reference numeral 603 in FIG. 6C, the given MCU can be understood to include a pattern of horizontal stripes, as shown in FIG. 7C. In other words, any eight consecutive pixels in the x-direction in the MCU have the same pixel value. For the sake of convenience, in the following description, a data pattern in which any eight consecutive pixels in the x-direction have the same pixel value, as shown in FIG. 7C, is referred to as "pattern C".

Figure 7D:
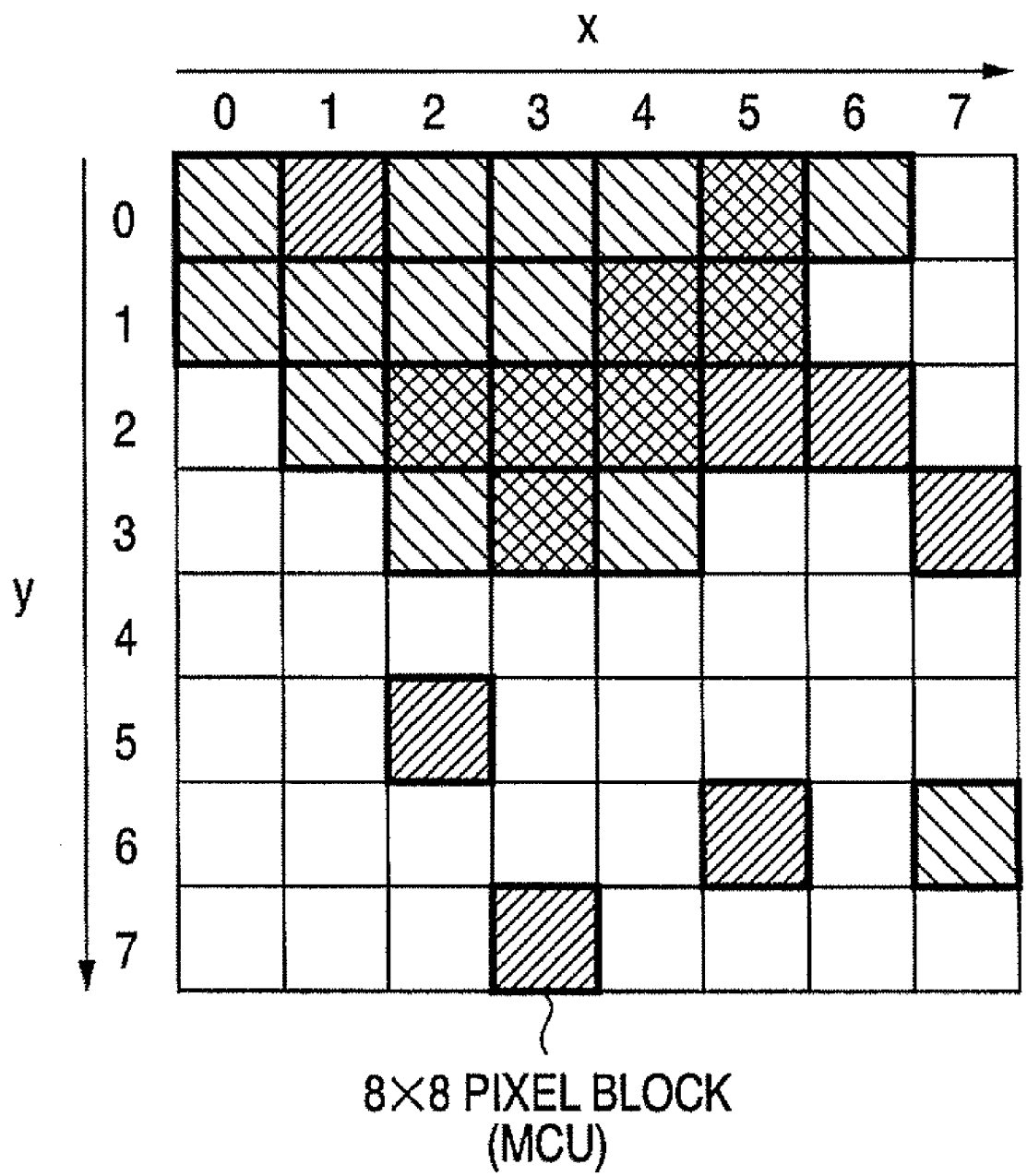

Lastly, if the data pattern does not correspond to any of the above, the MCU can be understood to have a mix of frequency components in the horizontal and vertical directions as shown in FIG. 7D. In other words, there is no guarantee of continuity in the x-direction or the y-direction. For the sake of convenience, in the following description, a data pattern without guaranteed continuity in the x-direction or the y-direction is referred to as "pattern D". By analyzing the DCT coefficients in this way, it is possible to specify the pixel value pattern of the MCU.

In this way, the MCU classification data generator 503 specifies the pixel value pattern of the MCU based on the distribution of the DCT coefficients, and outputs the resulting data as MCU classification data 520 to a color separated data generator 504.

Figure 6E:
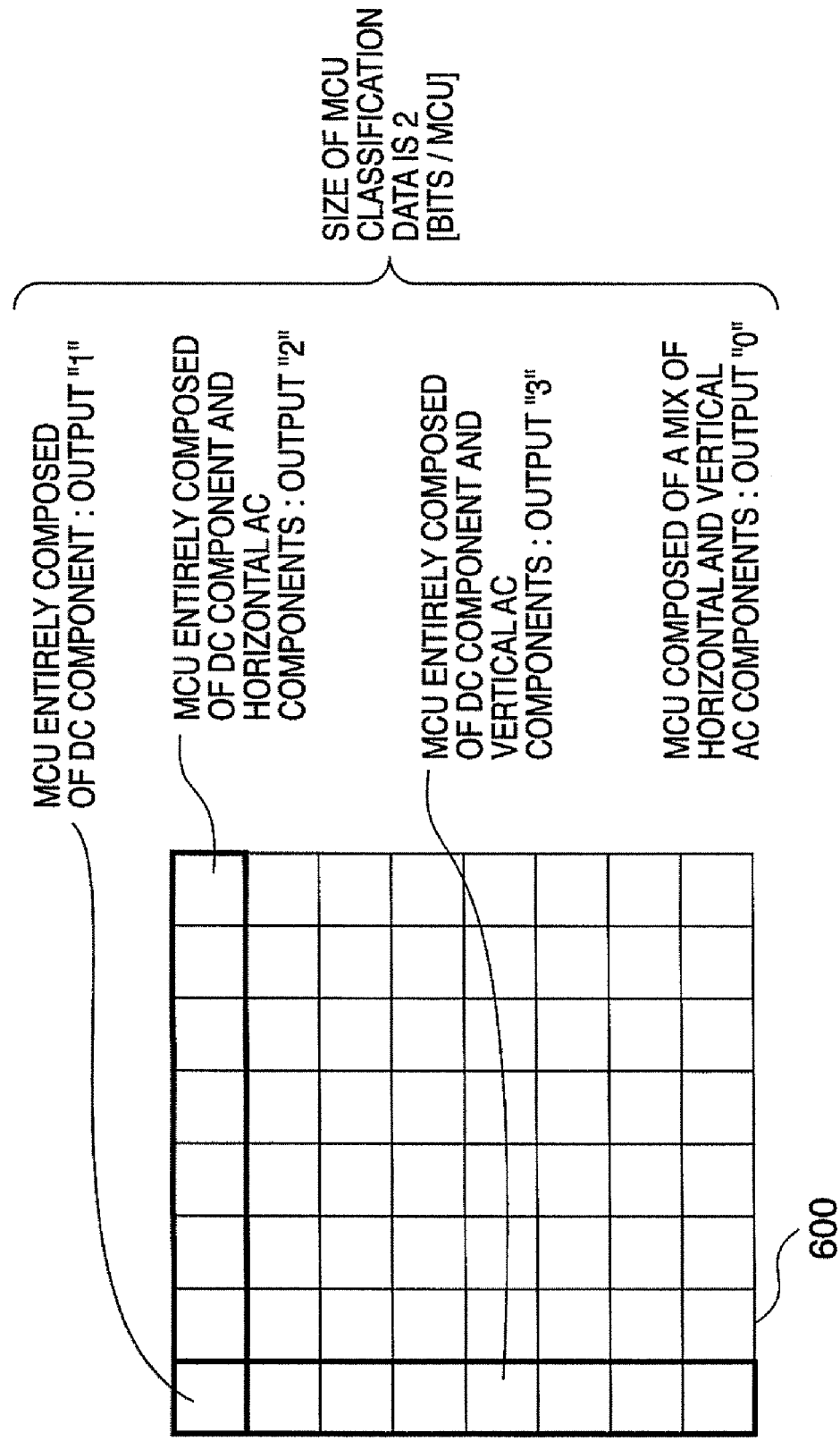

FIG. 6E shows an example of the MCU classification data 520 generated and outputted by the MCU classification data generator 503.

In this example, since the MCU is classified as being one of the above-described four patterns ("pattern A" to "pattern D"), the MCU classification data 520 consists of two bits per MCU. Thus, "1" is outputted for MCUs of "pattern A", "2" is outputted for MCUs of "pattern B", "3" is outputted for MCUs of "pattern C", and, lastly, "0" is outputted for "pattern D". The above is a description relating to a method for classifying the MCUs.

The MCU classification data 520 and the decoded JPEG data are then inputted into the color separated data generator 504.

The color separated data generator 504 includes a color space converter 505 and a color separator 506. The color space converter 505 converts the color space of the inputted decoded JPEG data into a predefined color space suitable for input to the color separator 506. Here, when the predefined color space is set to be sRGB, the YCbCr decoded JPEG data is converted to sRGB in the color space converter 505 using a matrix operations or the like. Various techniques exist for converting the color space, but in the present embodiment there are no particular limits on the technique employed.

The color separator 506 converts the inputted image data to the device-specific color space by further conversion processing using an LUT or the like, performs gradation correction where necessary, and outputs the result. For instance, if the predefined color space is sRGB and a CMYK color space is set as the device-specific color space, inputted sRGB data is converted and outputted as CMYK data (color separated data). Note that the device-specific color space is not limited to being the CMYK color space, and may be an RGB color space. In this case, the device-specific RGB color space must be converted to the CMYK color space. Various techniques exist for the color separation processing to convert to the device-specific color space, but in the present embodiment there are no particular limits on the technique employed.

Using the color space converter 505 and the color separator 506, the color separated data generator 504 generates device-specific color space data from the inputted decoded JPEG data, and outputs the result. At this point, when the color space converter 505 and the color separator 506 perform processing on all the pixels of the inputted decoded JPEG data, a huge amount of calculation and a very large number of memory accesses are required. However, performing color process caching using the MCU data patterns which can be specified by the MCU classification data 520 allows a large amount of reduction in the processing and the number of memory accesses for the color conversion to be realized.

The processing in the color separated data generator 504 of the present exemplary embodiment will be hereinafter explained with reference to FIG. 8 to FIG. 12.

Figure 8:
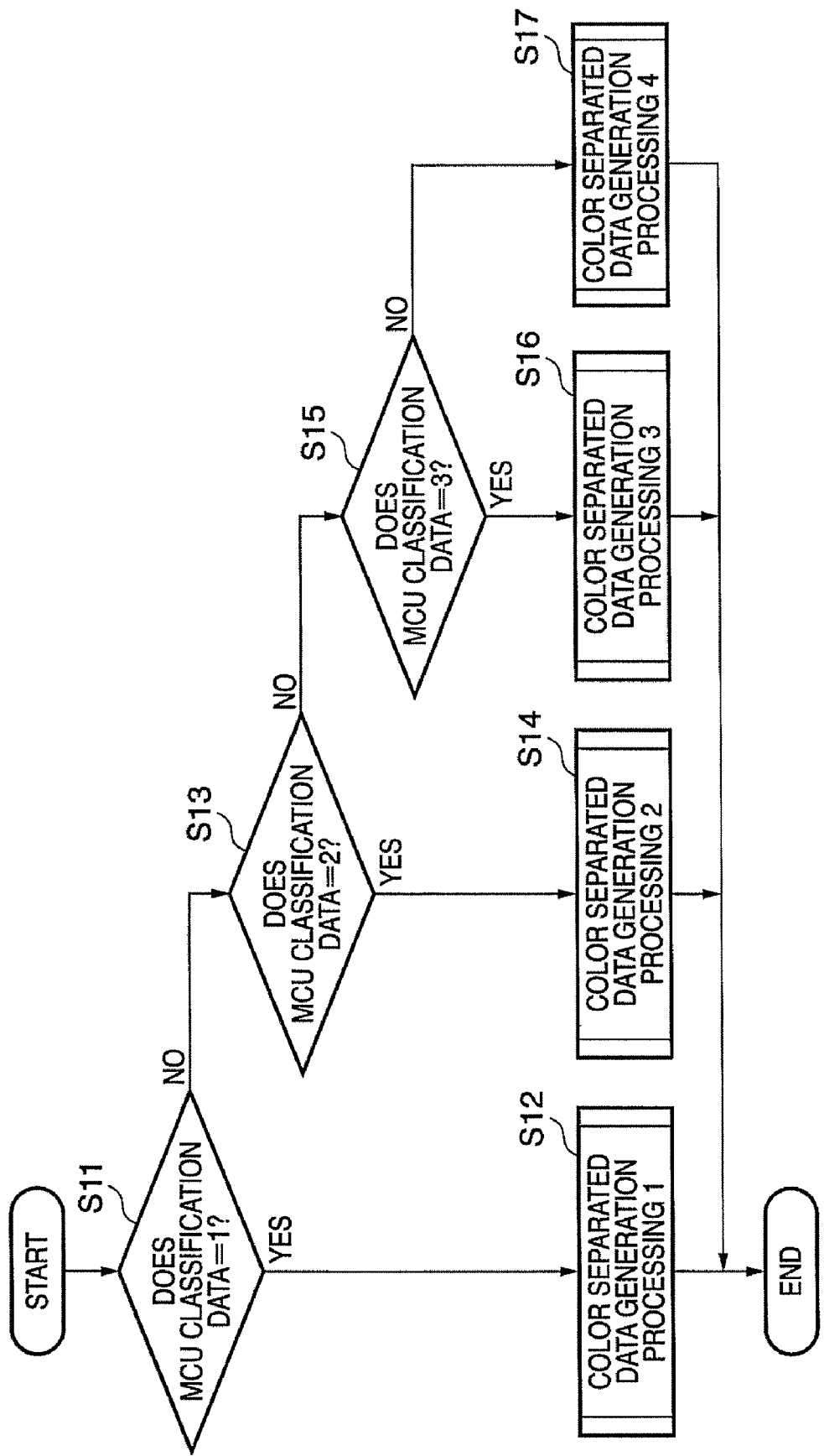
FIG. 8 is a flowchart describing processing executed by a color separated data generator of a first exemplary embodiment of the present invention.

FIG. 8 is a flow chart describing processing executed by the color separated data generator 504 of the first exemplary embodiment of the present invention. The drawing shows processing in a case that decoded data for a given MCU and the MCU classification data 520 for the MCU are inputted to the color separated data generator 504. Note that the program for executing this processing is stored in the memory 1014, and is executed under the control of the CPU 1001a.

First, in step S11, the color separated data generator 504 judges whether the inputted MCU classification data 520 for the MCU is "1", i.e. the above described "pattern A". If the MCU classification data 520 is "1", then the process advances to step S12, and executes color separated data generation processing 1 corresponding to "pattern A". Note that the "color separated data generation processing 1" in step S12 is described in detail later with reference to the flowchart of FIG. 9.

In a case that, in step S11, the MCU classification data 520 is not "1" the process advances to step S13, and determines whether the MCU classification data 520 is "2", i.e. the above-described "pattern B". If the MCU classification data 520 is "2", then the process advances to step S14 and executes color separated data generation processing 2 which makes use of the properties of pattern B. The "color separated data generation processing 2" of step S14 is described in detail later with reference to the flowchart of FIG. 10.

In a case that, in step S13, the MCU classification data 520 is not "2", the process advances to step S15, and determines whether the MCU classification data 520 is "3", i.e. the above-described "pattern C". If the MCU classification data 520 is "3", then the process advances to step S16 and executes color separated data generation processing 3 which makes use of the properties of pattern C. The "color separated data generation processing 3" of step S16 is described in detail later with reference to the flowchart of FIG. 11.

In a case that, in step S15, the MCU classification data 520 is not "3", it is understood that the MCU is of "pattern D", and the process advances to step S17 and executes color separated data generation processing 4 which takes into account the properties of pattern D. The "color separated data generation processing 4" of step S17 is described in detail later with reference to the flowchart of FIG. 12.

The flowchart of FIG. 8 describes the processing in the color separated data generator 504 to switch between the color separated data generation processing in accordance with the MCU classification data 520.

The processing of the "color separated data generation processing 1" will be explained with reference to FIG. 9.

Figure 9:
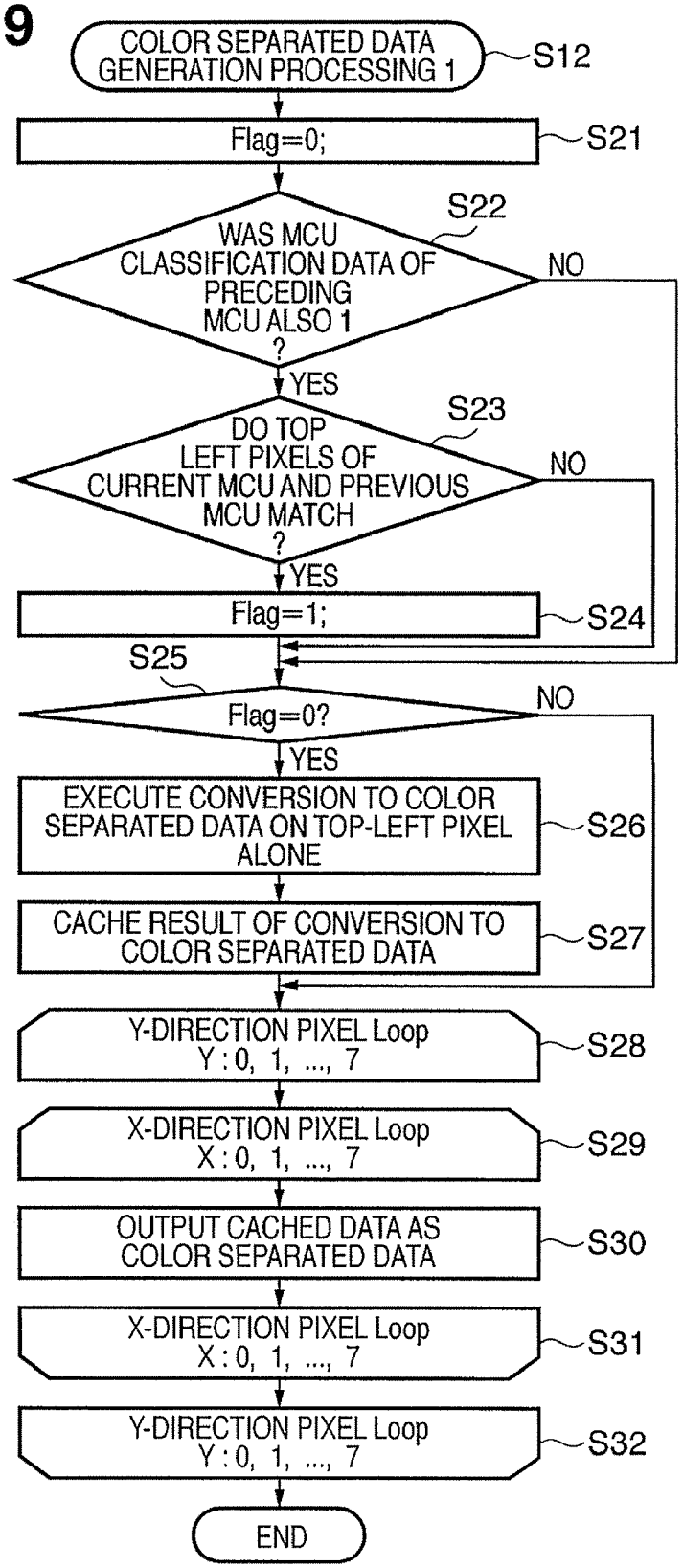
FIG. 9 is a flowchart describing generation processing 1 of color separated data corresponding to an MCU of "pattern A" of the first exemplary embodiment.

FIG. 9 is a flowchart describing the color separated data generation processing 1 of step S12 in FIG. 8, corresponding to an MCU of "pattern A". In "pattern A", 8×8 pixels in the MCU all have the same pixel value. Hence, in this processing, color space conversion and color separation processing are executed on a single pixel in the MCU, and the result is applied to all other pixels in the MCU, thereby realizing an increase in processing speed.

First, in step S21, a conversion flag is initialized to "0". Note that the conversion flag is stored in the memory 1014. Then, the process advances to step S22, and it is determined whether the MCU classification data 520 for the immediately preceding MCU of a current MCU is "1". If so, the process advances to step S23, and the top-left pixel values of the current MCU and the immediately preceding MCU are compared, and it is determined whether or not the top-left pixel values are same. If the two top-left pixel values match, the process advances to step S24, and the conversion flag is set to "1", and the process proceeds to step S25. On the other hand, if it is determined in step S22 that the MCU classification data 520 for the immediately preceding MCU is not "1", or if it is determined in step S23 that the top-left pixel values of the current MCU and the immediately preceding MCU fail to match, the process advances to step S25.

In step S25, it is determined whether the value of the conversion flag is "0". If the value is "0" (not match with the immediately preceding MCU), then pixel value calculation of the current MCU is necessary and so the process advances to step S26. In step S26, the above-described color space conversion processing and color separation processing on the top-left pixel of the current MCU are performed to generate color separated data. The process then advances to step S27, the color separated data obtained in step S26 are cached and then proceeds to step S28. The processing up to and including step S27 allows the preparation of color processing cache data for outputting the color separated data of the current MCU.

On the other hand, the conversion flag value of "1" in step S25 indicates consecutive MCUs of "pattern A" and that the current MCU is the same color as the immediately preceding MCU. Hence, the cached data used when outputting the color separated data of the immediately preceding MCU, can be applied to the current MCU without alteration. The process therefore skips the calculation processing of step S26 and step S27, and advances to step S28.

In steps S28 and S29 (and steps S31 and S32), loop processes of x-direction and y-direction pixels which allow the processing of step S30 to be performed on all 8×8 pixels of the current MCU are implemented. Thus, the processes of step S29 to step S31 result in the output of color separated data (cache data) in step S30 for the eight x-direction pixels (x=0 to x=7) indicated by a y-direction coordinate value. Then, by means of step S28 and step S32, the processes of steps S29 to step S31 are executed for the eight pixel lines corresponding to y=0 to y=7. In this way, the color separated data used for the immediately preceding MCUs or the color separation data cached in step S26 and step S27 are outputted as pixel values of the current MCU.

According to the processing shown in FIG. 9, it is possible to reduce the number of executions of the color space conversion processing and the color separation processing for the 8×8 set of 64 pixels by making use of the properties of "pattern A". The reduced amount of operations and fewer memory accesses of this processing allow fast color separation processing to be realized.

For the sake of convenience, a comparison of top-left pixels in the MCUs was described, but any corresponding pixels included in the MCUs may be used.

Figure 10:
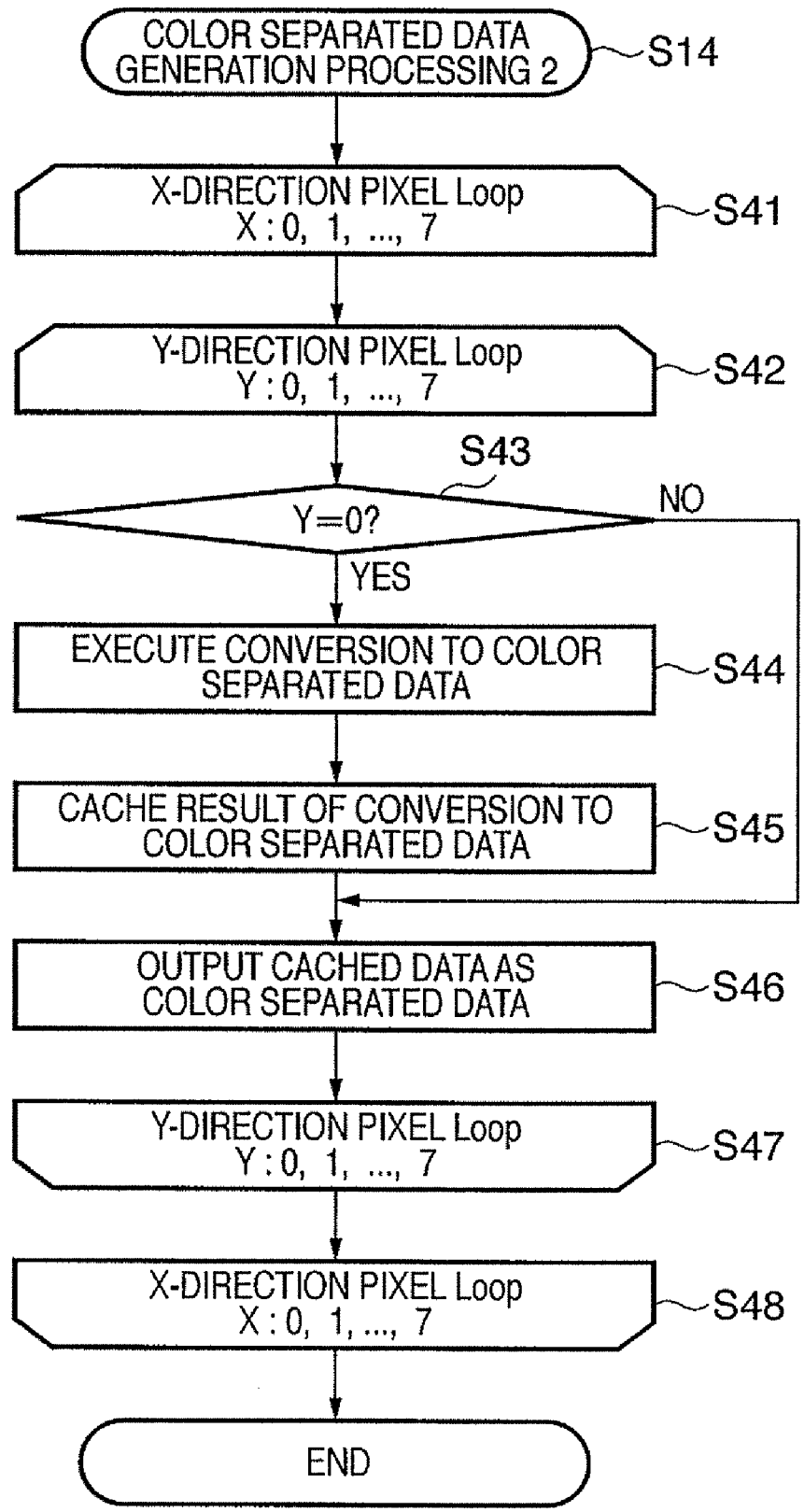
FIG. 10 is a flowchart describing generation processing 2 of color separated data corresponding to an MCU of "pattern B" of the first exemplary embodiment.

FIG. 10 is a flowchart describing the color separated data generation processing 2 of step S14 in FIG. 8 corresponding to an MCU of "pattern B". Since "pattern B" has sets of eight pixels in the y-direction column which have the same value, color space conversion processing and color separation processing are executed on only one pixel in each y-direction column. Each result is then applied to all other pixels in the corresponding y-direction column, thereby speeding up the processing.

In steps S41 and S42 (and steps S47 and S48), loop process for x-direction and y-direction pixel data is performed. In other words, for the 8×8 pixels of the current MCU, the processing for eight pixel data in y-direction column, i.e. for each column, is repeated eight times in the x-direction.

In step S43, it is determined whether y=0 or not, i.e. whether a pixel is the first (top) pixel in the y-direction column. If it is determined y=0 in step S43, it indicates that the color processing cache data for outputting the color separated data of the eight y-direction pixels has not been prepared, and the process therefore advances to step S44. In step S44, the above-described color space conversion processing and color separation processing on the top pixel data are performed to generate color separated data of the top pixel data. The process then proceeds to step S45, and the color separated data obtained in step S44 is stored as color processing cache data of the y-direction column. The process then advances to step S46, and outputs the color processing cache data cached in step S45 as the color separated data for the target pixel in the y-direction column.

Since the value of y for the next pixel data in the y-direction column is no longer "0" because the value of y is incremented in step S47, the process advances from step S43 to step S46, the color separated data cached in step S45 is read out as the pixel value of the next pixel data in the y-direction column. This processing is executed for y=0 to y=7 and further repeated for x=0 to x=7 as shown in steps S41 and S48.

As described above, the processing shown in the flowchart of FIG. 10 makes use of the properties of "pattern B" to reduce the number of executions of the color space conversion processing and the color separation processing on the 8×8 pixels (64 pixels) to a total of eight calculations, one calculation for each column. As a result, fast color separation processing with a reduced amount of operations and fewer memory accesses can be realized.

For the sake of convenience, the case in which the pixel values of the uppermost row of pixels are calculated is described. However, color conversion process may be implemented on a pixel value extracted from another position. In this case, the result would be cached, and then applied to all other pixels in the y-direction set that includes the target pixel.

Figure 11:
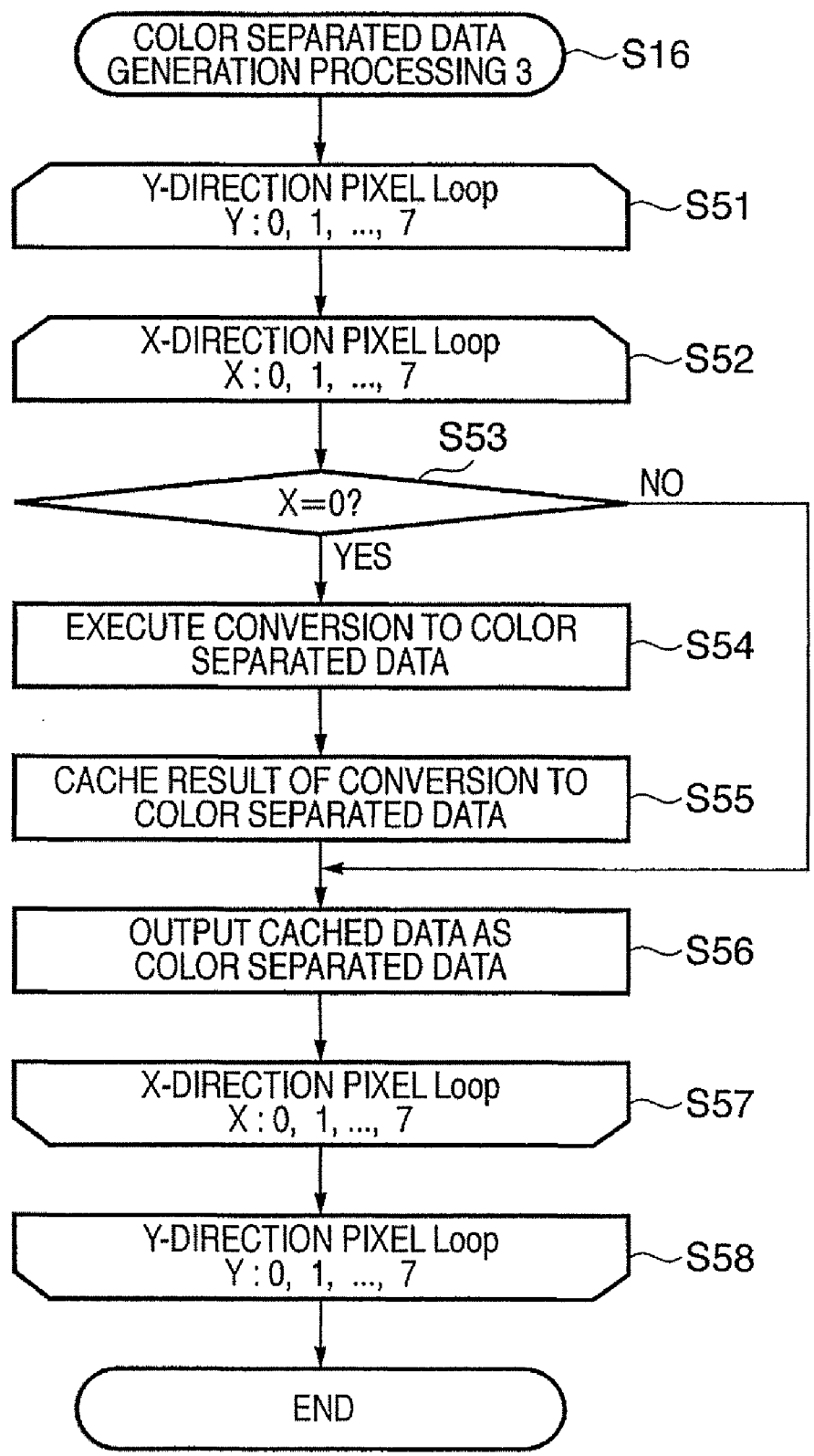
FIG. 11 is a flowchart describing generation processing 3 of color separated data corresponding to an MCU of "pattern C" of the first exemplary embodiment.

FIG. 11 is a flowchart describing the color separated data generation processing 3 of step S16 in FIG. 8 corresponding to an MCU of "pattern C". Since "pattern C" has sets of eight pixel values in the x-direction row which have the same value, color space conversion processing and color separation processing are executed on only one pixel in each x-direction row. Each result is then applied to all other pixels in the corresponding x-direction row, thereby speeding up the processing. Since this processing can be realized by switching x and y in the processing of the flowchart in FIG. 10, the description below is brief.

In steps S51 and S52 (and steps S57 and S58), the loop process for x-direction and y-direction pixel data is performed. In other words, for the 8×8 pixel (64 pixels) of the current MCU, the processing for pixel data in the x-direction row, i.e. each row, is repeated eight times in the y-direction.

In step S53, it is determined whether or not x=0, i.e. whether the pixel is the first (top) pixel in the x-direction row. If x=0, then the process advances to step S54, the above-described color space conversion processing and color separation processing on the top pixel are performed to generate color separated data of the top pixel. The process then advances to step S55, and the color separated data obtained in step S54 is cached as the color processing cache data for the x-direction row. Then in step S56, the color processing cache data cached in step S55 is read out as the color separated data for the target pixel in the x-direction row.

According to the processing shown in FIG. 11, it is possible to reduce the number of executions of the color space conversion processing and the color separation processing for the 8×8 pixels (64 pixels) into a total of eight calculations by making use of the properties of "pattern C" and performing only one calculation for each x-direction row. As a result, fast color separation processing resulting from fewer calculations for the pixels of the MCU and fewer memory accesses can be realized.

For the sake of convenience, the case in which the pixel value of the leftmost column of pixels (the first pixel in each row) is calculated and the calculated value is applied to other pixels in the x-direction row is described. However, the color conversion process may be implemented on a pixel value extracted from another position in each x-direction row. In this case, the result is cached and then applied to all other pixels in the x-direction row that includes the target pixel.

Figure 12:
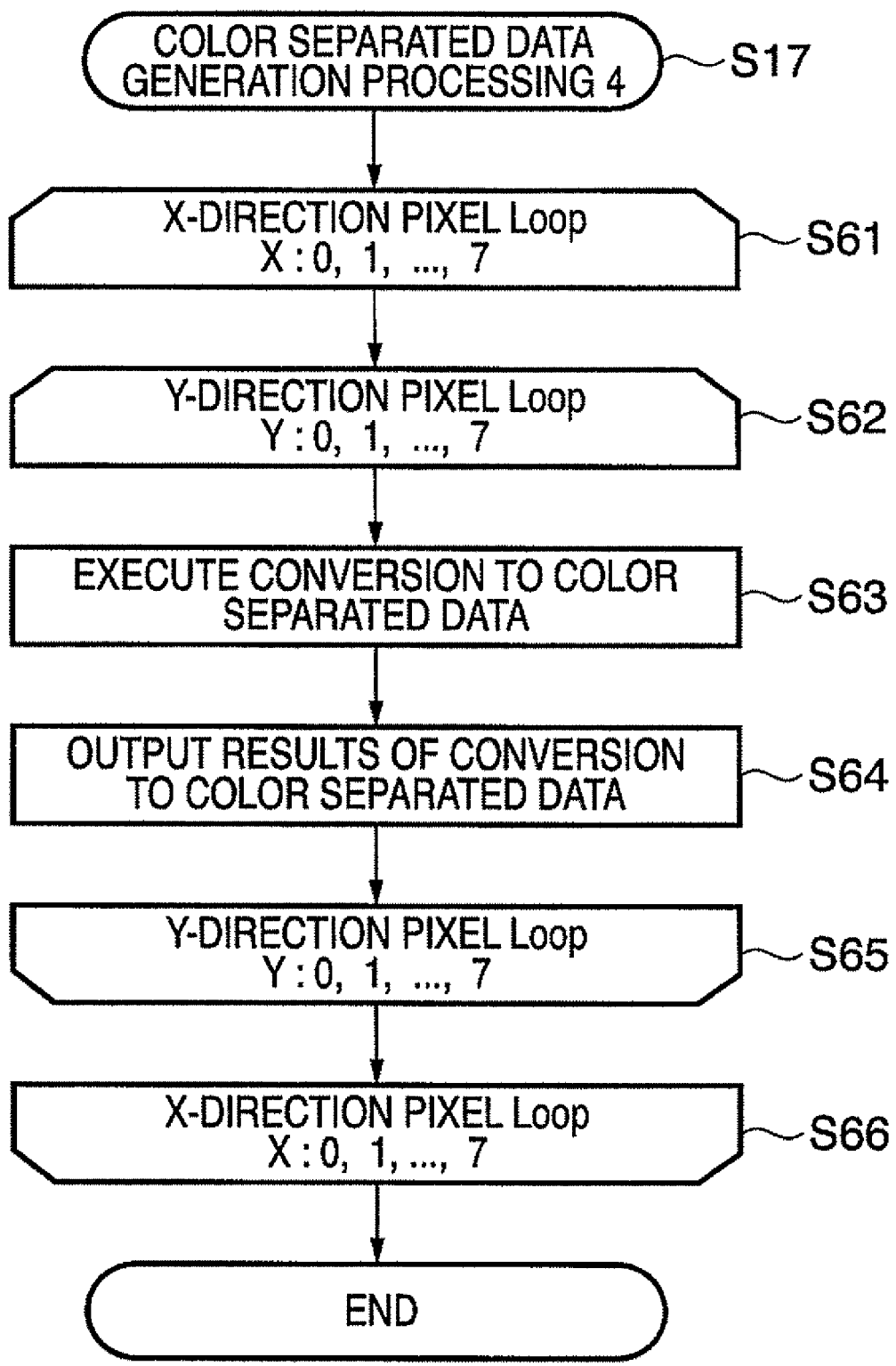
FIG. 12 is a flowchart describing generation processing 4 of color separated data corresponding to an MCU of "pattern D" of the first exemplary embodiment.

FIG. 12 is a flowchart describing the color separated data generation processing 4 of step S17 in FIG. 8 corresponding to an MCU of "pattern C". "Pattern D" differs from the above-described patterns in that there is no guarantee of continuity of pixels in both the x-direction and the y-direction. Hence, it is necessary to execute the color space conversion processing and the color separation processing on each of all 8×8 pixels in the current MCU.

In steps S61 and S62 (and steps S65 and S66), the loop process for x-direction and y-direction pixel is implemented corresponding in number to the number of pixels. In other words, the processes of step S63 to step S64 are performed for each of 8×8 pixels in the current MCU. In step S63, the color space conversion processing and color separation processing on the pixel is performed to generate color separated data of the pixel data. Then, in step S64, the color separated data obtained in step S63 is outputted as the color separated data for the pixel data.

With the above described processing in FIGS. 8 through 11, fast color separation processing that makes use of the DCT frequency characteristics of the MCU can be realized. Further, the processing of FIG. 9, FIG. 10, and FIG. 11 has the following advantages in common.

As is clear from the above description, the processing of FIG. 9, FIG. 10 and FIG. 11 can be realized with a construction which always stores a single item of color processing cache data. Hence the cache region is reduced to a minimum, and the technique can be realized at lower costs than techniques in which a plurality of items of color processing cache data are generated and stored in a cache data table. Moreover, it is unnecessary to determine whether or not the color processing cache data should be applied. This is because the data pattern of the MCU is specified (as pattern A, B, C, or D) by the MCU classification data 520, and, for each data pattern, it possible to specify how the color processing cache data should be generated and to which pixel the generated color processing cache data should be applied. As a result, it eliminates the judgment processing to determine whether or not the color processing cache data is hit, and a further increase in the speed of processing can be achieved.

Moreover, since the processing is performed with the MCU as the basic unit, the number of cache mishits generated between the MCUs can be reduced compared with the simple raster unit processing system. This arrangement has the advantage that the number of generation process of color processing cache data can be reduced to a minimum.

The description of an arrangement in which the above-described fast generation processing for color separated data is applied in print data generation processing will be explained.

As described above with reference to FIG. 4, print data is generated in accordance with the following steps.

(1) An image file specified for printing is read and image data of the image file decoded.

(2) The color space of the image data resulting from the decoding is converted to a device-specified color space.

(3) The image data is resized in accordance with layout information.

(4) A conversion (half-toning) is performed to give quantized amounts representing the state of each pixel.

Steps (1) and (2) of the above steps are realized by fast processing using the above described arrangement. The following description explains how the remaining step (3) and step (4) are realized on the basis of the above-described first exemplary embodiment.

Hereinafter, an arrangement in which the above-described generation processing for color separated data is applied in print data generation processing is described with reference to FIG. 13.

Figure 13:
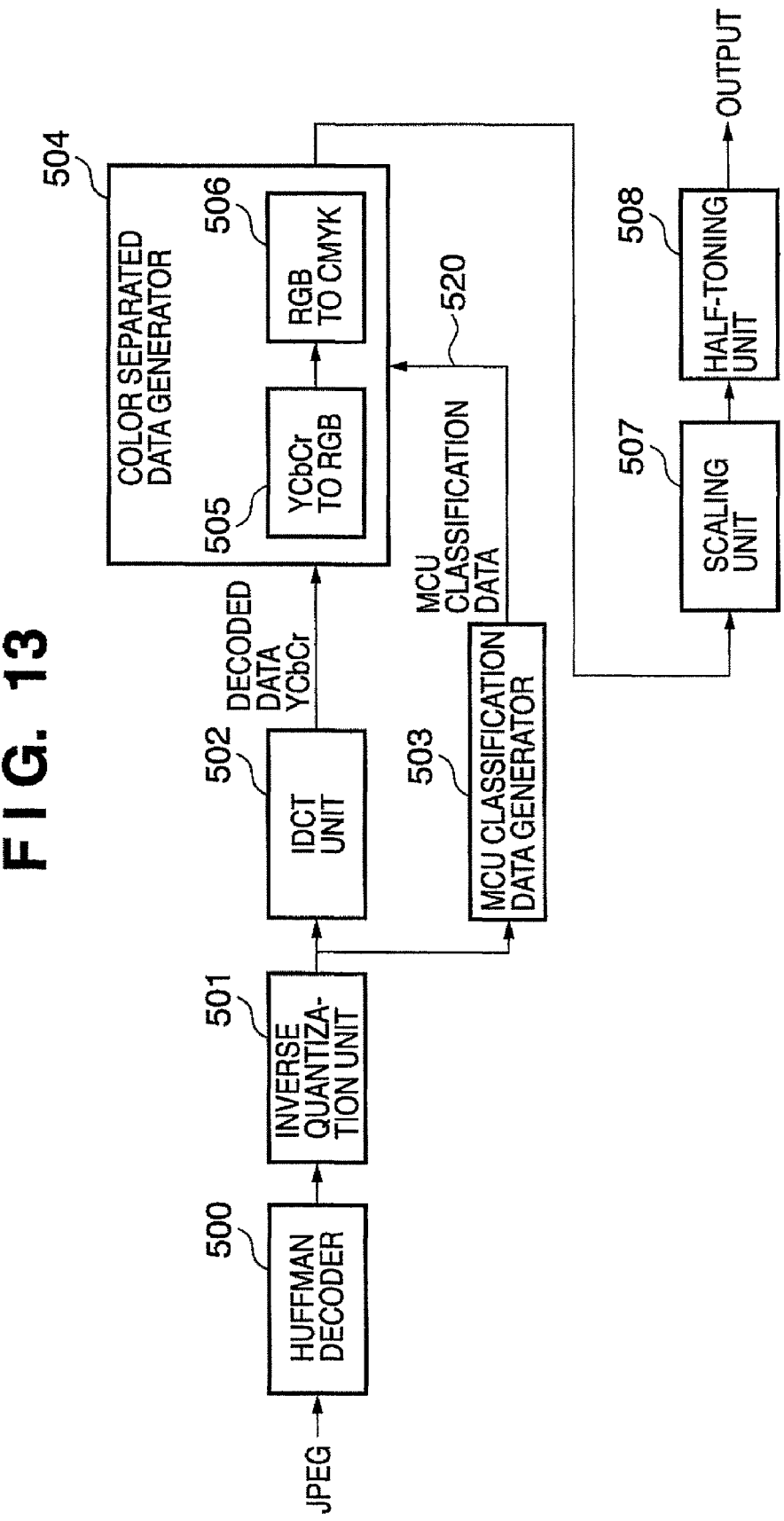
FIG. 13 is a block diagram explaining another example of color space conversion processing of the first exemplary embodiment of the present invention.

FIG. 13 is a block diagram explaining another example of color space conversion processing of the first exemplary embodiment of the present invention. The arrangement in FIG. 13 is the same as the arranging in the above-described FIG. 5 from the Huffman decoder 500 to the color separated data generator 504, and the processing performed by each block is the same as those in FIG. 5.

The scaling unit 507 resizes the color separated data outputted by the color separated data generator 504 to an actual print size in accordance with layout information such as the paper size specified by the user and the layout method. Various methods exist for resizing image data, including a nearest neighbor method, a bilinear method, and a bicubic method. Any of these methods may be used. Note, however, that in the case of the bilinear and bicubic methods, since interpolation calculations of plural pixel values are performed, it is difficult to process the image data in MCU units. It is necessary to input a band of image data composed of at least one line of MCUs to the scaling unit 507. On the other hand, in a case that a scaling method, such as the nearest neighbor method, which does not require an interpolation calculation using a plurality of items of pixel data is used, there is no particular limit on the input data units. Image data of single MCU, or of a band unit composed of a line of MCUs or the like can be received and processed.

A half-toning unit 508 implements a half-toning method, such as an error diffusion method, on the color separated data that has been resized to an actual print size generated by the scaling unit 507, and quantizes and outputs the result. For instance, in a case that the error diffusion method is used as the half-toning method, the properties of the processing for diffusing the error in the error diffusion method requests for the scaling unit 507 to prepare at least image data of one raster. Hence, it is necessary to prepare a band of resized image data generated from at least one MCU line, and input the resized image data to the half-toning unit 508.

With the above-described arrangement, it is possible to realize print data generation processing using fast color separated data generation processing that makes use of the frequency characteristics in MCU.

Second Exemplary Embodiment

In the first embodiment above, an example of the processing for generating the color separated data from the decoded JPEG data is accelerated by making use of the MCU frequency characteristics is described. However, if a scaling method in the scaling unit 507, such as the nearest neighbor method in the first exemplary embodiment, which does not necessitate interpolation calculations using pixel values from a plurality of pixels is used, then it is possible to accelerate the scaling processing as well as the color separation processing. This is because in scaling methods, such as the nearest neighbor method, which do not necessitate interpolation calculations using a plurality of pixel values, it possible to implement scaling processing in an MCU unit.

Thus, in the second exemplary embodiment, an example is described in which the scaling method is assumed to be one which does not necessitate interpolation calculations using plural pixel values, the color separated data is speedily generated after scaling, and the print data is generated from the resized color separated data. Thus in the following description, it is assumed that the nearest neighbor method is used as the scaling method in the scaling unit 507.

FIG. 14 is a block diagram explaining color space conversion processing of a second exemplary embodiment of the present invention.

In the drawing, the Huffman decoder 500, the inverse quantization unit 501, the IDCT unit 502, the MCU classification data generator 503, the color space converter 505, the color separator 506, and the half-toning unit 508 are the equivalents of those shown in FIG. 5 and FIG. 13. Since the arrangement of FIG. 14 only differs from the above-described first exemplary embodiment in terms of a resized color separated data generator 509 and a scaling unit 510, the description is limited to these two units.

The resized color separated data generator 509 receives the decoded JPEG data and the MCU classification data 520, and rapidly generates color separated data resized to the actual print size determined by the user-specified layout information.

The following describes details of the processing performed by the resized color separated data generator 509 and the scaling unit 510, with reference to flowcharts in FIG. 15 to FIG. 19.

Figure 15:
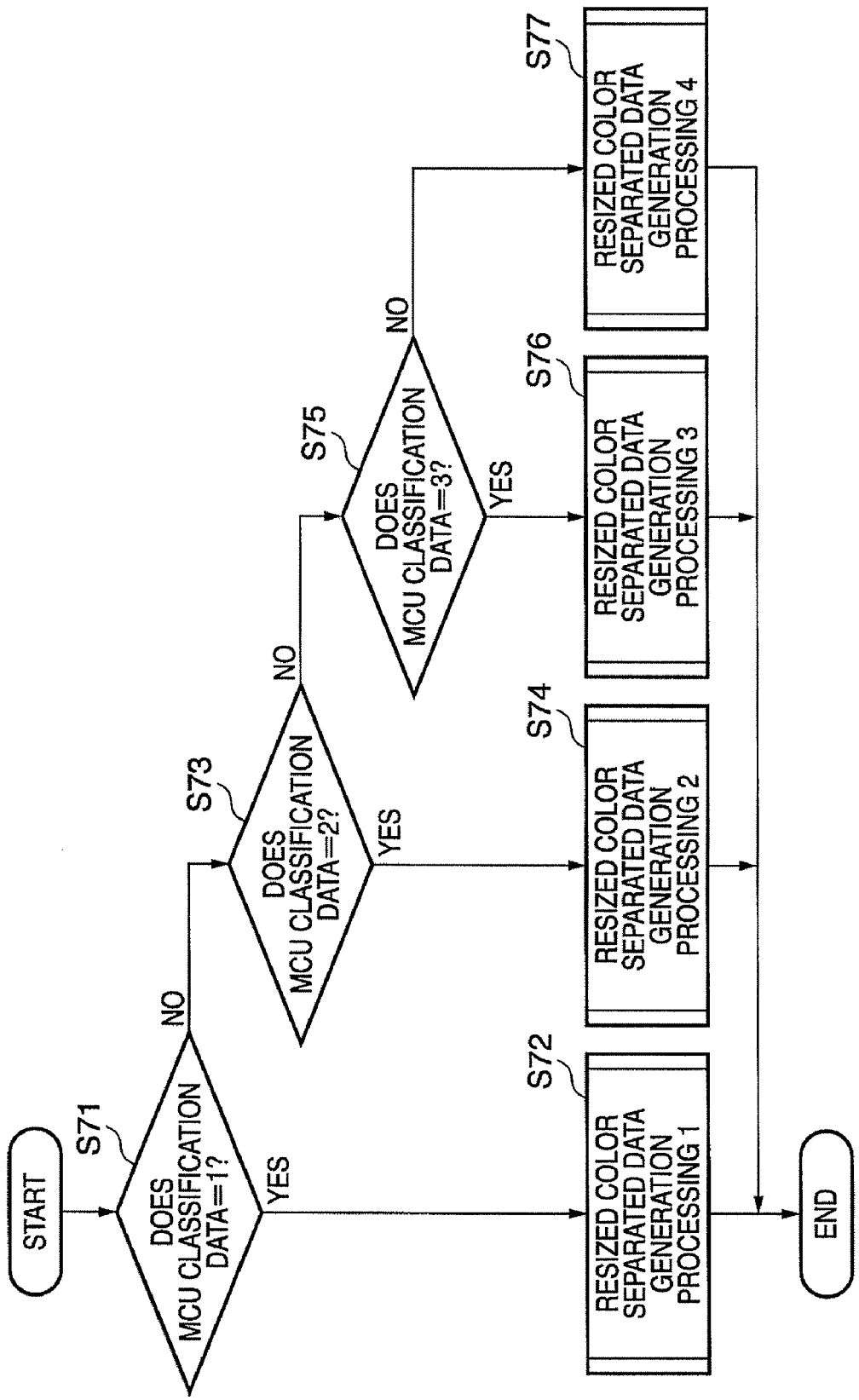
FIG. 15 is a flow chart describing processing executed by the resized color separated data generator of the image processing apparatus of the second exemplary embodiment of the present invention.

FIG. 15 is a flow chart describing processing executed by the resized color separated data generator 509 of the image processing apparatus of the second exemplary embodiment of the present invention. The drawing shows the processing performed in a case that decoded data of a given MCU and MCU classification data 520 of the MCU are inputted to the resized color separated data generator 509. Since the construction of the image processing apparatus 12 of the second exemplary embodiment is the same as the construction of the image processing apparatus of the first exemplary embodiment (FIG. 2), a description of the image processing apparatus is omitted. Note that the program for executing the processing is stored in the memory 1014, and is executed under the control of the CPU 1001a.

Figure 16:
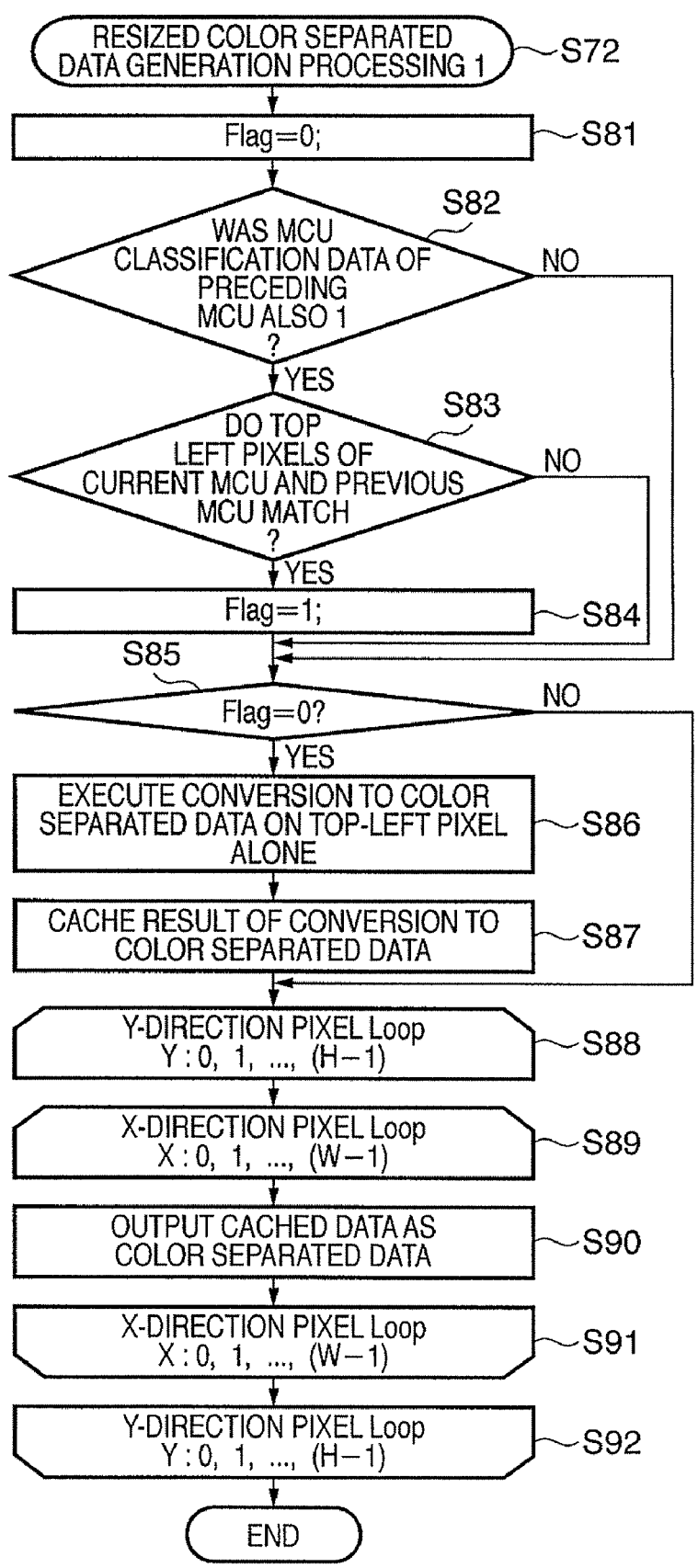
FIG. 16 is a flowchart describing generation processing 1 of resized color separated data corresponding to an MCU of "pattern A" of the second exemplary embodiment.

First, in step S71, it is determined whether or not the MCU classification data 520 of a current MCU is "1". If it is determined in step S71 that the MCU classification data 520 is "1", it is determined that the MCU is of "pattern A", and the process advances to step S72 and resized color separated data generation processing 1 is executed as shown in FIG. 16 which takes into account the properties of pattern A. Note that the resized color separated data generation processing 1 is described later with reference to the flowchart of FIG. 16.

If it is determined in step S71 that the MCU classification data 520 is not "1", the process advances to step S73, and it is determined whether or not the MCU classification data 520 is "2". If the MCU classification data 520 is "2", then it is determined that the MCU is of "pattern B" and the process advances to step S74 and resized color separated data generation processing 2 which makes use of the properties of pattern B is executed. The resized color separated data generation processing 2 is described later with reference to the flowchart of FIG. 17.

If it is determined in step S73 that the MCU classification data 520 is not "2", the process advances to step S75, and it is determined whether or not the MCU classification data 520 is "2". If the MCU classification data is "3", then it is determined that the MCU is of "pattern C", and the process therefore advances to step S76 and resized color separated data generation processing 3 which makes use of the properties of pattern C is executed. The resized color separated data generation processing 3 is described later with reference to the flowchart of FIG. 18.

If it is determined in step S75 that the MCU classification data 520 is not "3", then it is determined that the MCU is of "pattern D", and the process advances to step S77 and resized color separated data generation processing 4 which takes into account the properties of pattern D is executed. The resized color separated data generation processing 4 is described later with reference to the flowchart of FIG. 19. Thus, as shown in the flowchart of FIG. 15, the resized color separated data generator 509 switches the resized color separated data generation processing method in accordance with the MCU classification data 520.

The resized color separated data generation processing 1 of the second exemplary embodiment of the present invention will be explained with reference to the flowchart of FIG. 16.

FIG. 16 is a flowchart describing generation processing 1 (step S72) of resized color separated data corresponding to an MCU of "pattern A" of the second exemplary embodiment. In "pattern A", 8×8 pixels in the MCU all have the same value. Hence, in this processing, color space conversion and color separation processing are executed on a single pixel in the MCU and the result is applied to all other pixels in the current MCU, thereby realizing an increase in processing speed.

FIG. 16 shows processing for the case that an 8×8 pixel MCU has been resized to a size of W×H pixels. The W×H size which results from scaling can be calculated using a scaling method, such as the nearest neighbor method. Since such methods have no special content, a description of the scaling method has been omitted from the second exemplary embodiment.

First, in step S81, a conversion flag is initialized to "0" and stored in the memory 1014 (FIG. 2). The process then proceeds to step S82, and it is determined whether the value of the MCU classification data 520 for an immediately preceding MCU of the current MCU is "1". If the value is "1", then the process advances to step S83, the top left pixels of the current MCU and the immediately preceding MCU are compared, and it is determined whether or not there is a match. If the two top left pixels match, the process advances to step S84, the conversion flag is changed to "1" to indicate that the cached color separated data can be used, and the process advances to step S85. Note that, if in step S82, the MCU classification data 520 is not "1" for the immediately preceding MCU, or if in step S83 the top-left pixel values of the current MCU and the immediately preceding MCU fail to match, the process advances to step S85.

In step S85, it is determined whether or not the value of the conversion flag is "0". Here, a flag value of "1" indicates consecutive MCUs of "pattern A" and that the current MCU and the immediately preceding MCU are of the same color. Hence, the process advances to step S88, and the cached data used when outputting the color separated data of the immediately preceding MCU to the current MCU without alteration. Conversely, if the value of the flag is "0", then the process advances to step S86 and the conversion processing is executed to generate color separated data for the current MCU.

In step S86 and steps S87, processing for generating the cache data is executed. In step S86, the above-described color space conversion processing and color separation processing on the top-left pixel of the current MCU is performed to generate color separated data. The process then advances to step S87, and the color separated data obtained in step S86 is cached. Thus, the processing of step S86 and step S87 allows color processing cache data to be calculated for the output of the resized color separated data for the current MCU.

In steps S88 and S89 (and steps S91 and S92), loop processes for the pixels in the y-direction and the x-direction are implemented so that the processing of step S90 is performed on all pixels in the H×W region of the resized current MCU. Then, in step S90, the color processing cache data, which as been cached in advance or in step S87, is outputted as the resized color separated data for the target pixel.

According to the processing shown in FIG. 16, it is possible to reduce the number of executions of the color space conversion processing and the color separation processing for the 8×8 pixels in the MCU by making use of the properties of "pattern A". This enables fast color separation processing with fewer calculations and memory accesses to be realized.

Furthermore, processing with fewer memory accesses than the processing in the first exemplary embodiment can be realized. This is because, rather than performing the scaling after first storing the color separated data for the 8×8 pixels in the memory 1014, the data cached in step S87 is outputted directly as the resized color separated data in step S90.

For the sake of convenience, the case in which the color separated data is of the top-left pixel has been described, but a pixel of any position in the MCU may be used.

Figure 17:
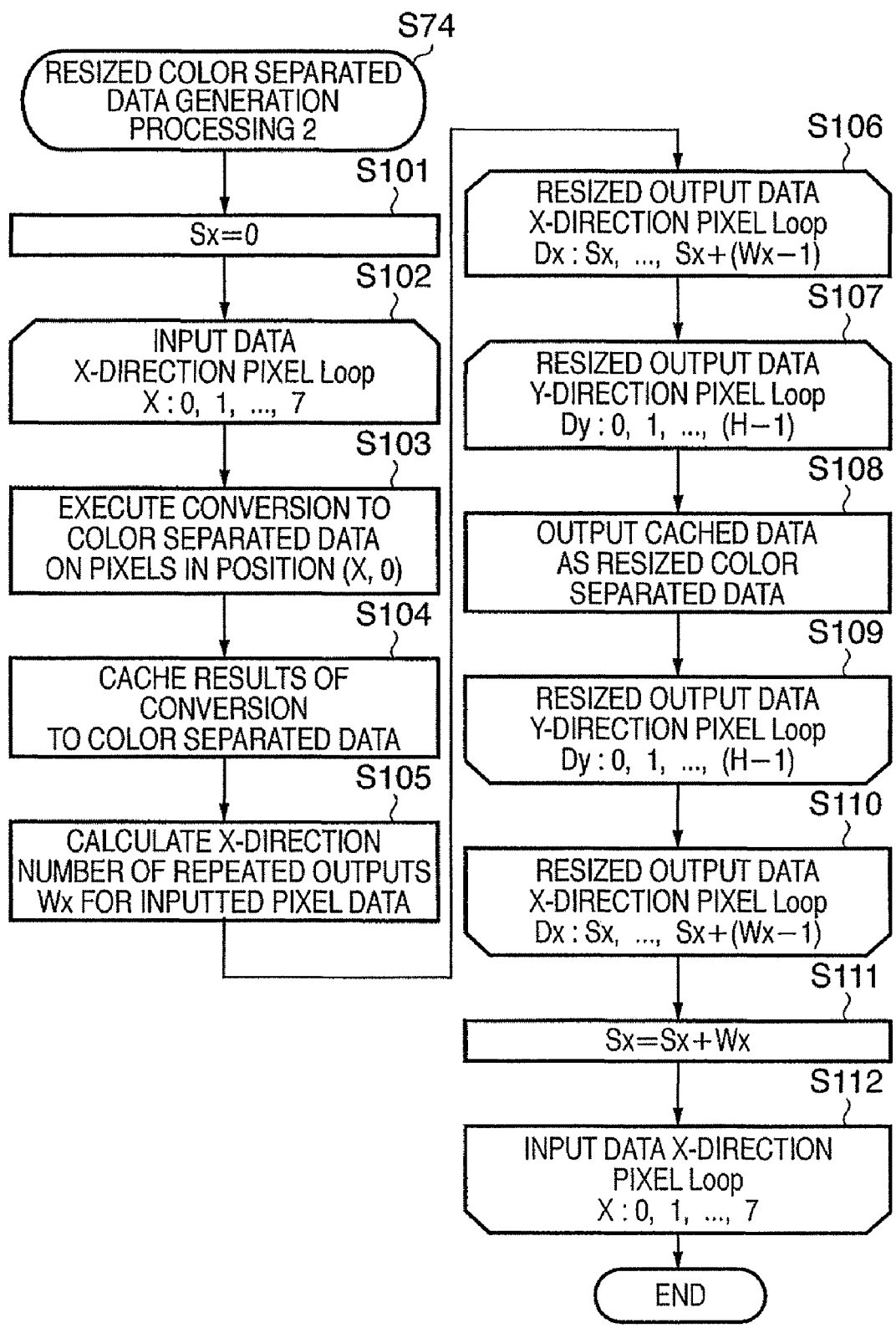
FIG. 17 is a flowchart describing generation processing 2 of resized color separated data corresponding to an MCU "pattern B" of the second exemplary embodiment.

The following describes the resized color separated data generation processing 2 with reference to FIG. 17.

FIG. 17 is a flowchart describing generation processing 2 (step S74) for resized color separated data corresponding to the MCU of "pattern B", of the second exemplary embodiment. Since "pattern B" has sets of eight pixel values in the y-direction of the input data which have the same, color space conversion processing and color separation processing are executed on only one pixel in each y-direction column. The results are then applied to pixels in the resized x-direction rows and y-direction columns, thereby speeding up the processing. For instance, in a case that the current MCU is resized to a 16×16 pixel set using the nearest neighbor method, a single item of color processing cache data is applied to a 2×16 pixel region.

FIG. 17 is a flowchart showing the processing for a case that an 8×8 pixel MCU has been resized to a W×H pixel set. The W×H size which results from scaling can be calculated using a scaling method, such as the nearest neighbor method. Since such methods have no content relevant to this document, a description of the scaling method has been omitted from the second exemplary embodiment.

First, in step S101, a variable Sx is initialized to "0". The variable Sx is stored in the memory 1014. In step S102 and step S112, loop processing is performed for pixel of each x-direction row of the input image data. In step S103 and step S104, the color space conversion processing and the color separation processing are performed on a single pixel at (x, 0) in each y-direction column of input image data, and the results of the conversion are cached.

In step S105, the number of x-direction repetitions Wx for the output corresponding to the currently targeted input pixel data is calculated. Like the above-described W and H, Wx can be calculated using a nearest neighbor method without any content relevant to this application, and so a description of these calculations is omitted. Note that the total of Wx for x=0 to x=7 is W.

As a specific example of settings values, in a case that the MCU has been resized to 16×16 using the nearest neighbor method, an item of color processing cache data is applied to a 2×16 pixel region, and so Wx=2 for all x.

In steps S106 and S107 (and steps S109 and S110), loop processing for x-direction and y-direction pixel data is performed to output resized data. In step S105, the color processing cache data obtained using the processing up to and including step S104 is outputted as the resized color separated data to the Wx×H rectangular region with top-left pixel coordinates (Sx, 0). In step S111, Wx is added to Sx to update the output position for the resized color separated data.

According to the processing shown in FIG. 17, it is possible to reduce the number of executions of the color space conversion processing and the color separation processing for the 8×8 pixels into one pixel for each column, and a total of eight calculations, by making use of the properties of "pattern B". As a result, fast color separation processing with fewer calculations and memory accesses can be realized.

Furthermore, processing with fewer memory accesses than the processing in the above-described first exemplary embodiment can be realized. This is because, rather than performing the scaling after first outputting the color separated data for the 8×8 pixels to memory, the data cached in step S104 is outputted directly as the resized color separated data. For the sake of convenience, the case in which calculations are performed for the uppermost row of pixels is described. However, color conversion may be implemented on pixels extracted from another position, and the result cached.

Figure 18:
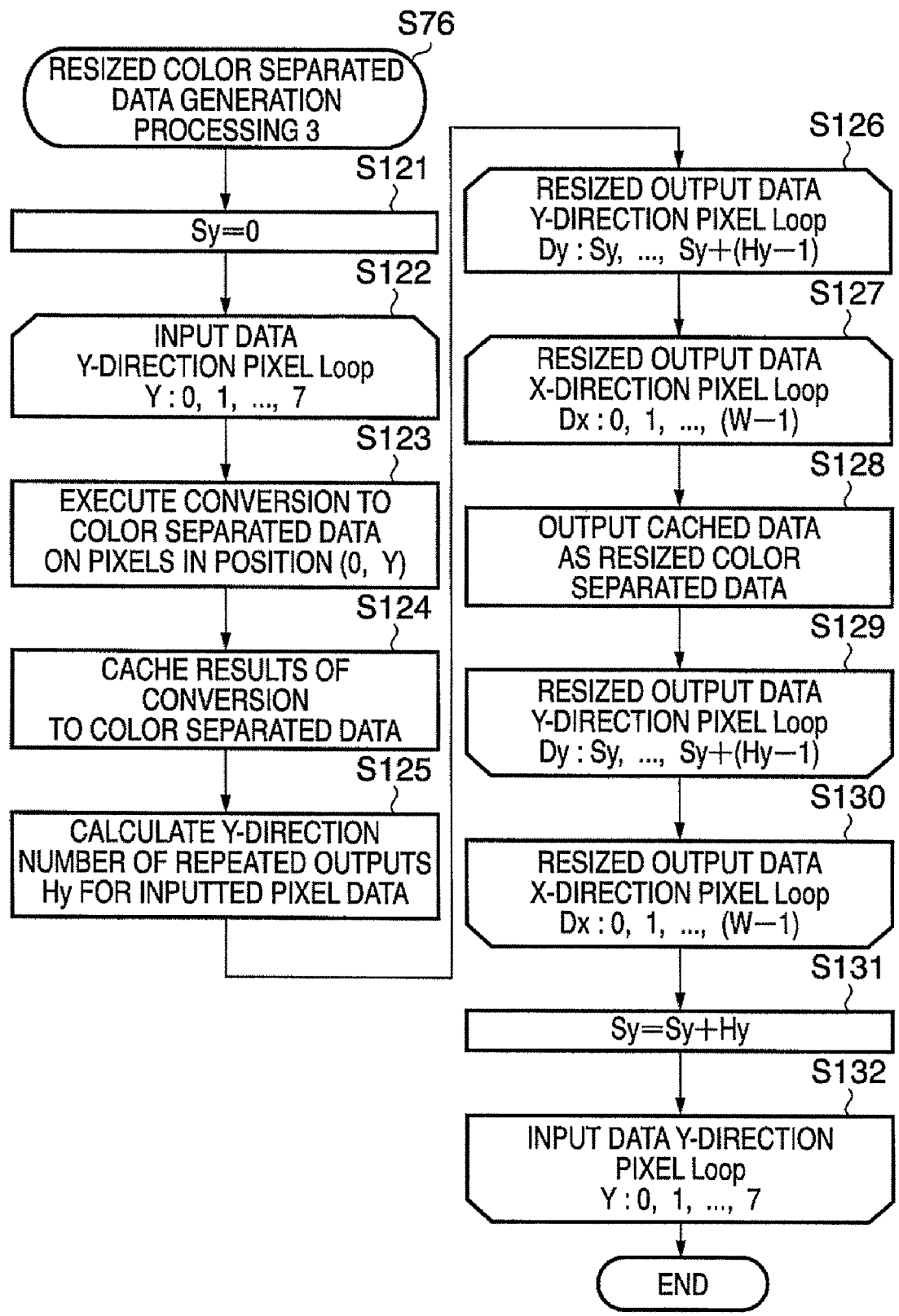
FIG. 18 is a flowchart describing generation processing 3 of resized color separated data corresponding to an MCU "pattern C" of the second exemplary embodiment.

FIG. 18 is a flowchart describing generation processing 3 (step S76) for color separated data corresponding to the MCU of "pattern C", of the second exemplary embodiment. Since "pattern C" has pixel values which are the same for sets of eight pixels in the x-direction row of the input image data, the color space conversion processing and color separation processing are executed on only one pixel in each x-direction row. The results are then applied to pixels in the resized x-direction rows and y-direction columns, thereby speeding up the processing. For instance, when the current MCU is resized to a 16×16 pixel set using the nearest neighbor method, an item of color processing cache data is applied to a 16×2 pixel region.

FIG. 18 shows a flowchart of processing for a case that an 8×8 pixel MCU has been resized to W×H pixels. The W×H size which results from scaling can be calculated using a scaling method, such as the nearest neighbor method. Since this scaling method has no special content relevant to this application, a description has been omitted.

First, in step S121, a variable "Sy" is initialized to "0". The variable Sy is then stored in the memory 1014. In step S122 and step S132, loop processes are applied to each y-direction pixel of the image data. According to step S123 and step S124, the color space conversion processing and color separation processing are performed on pixel data of on pixel in each x-direction row of the input data, and the results of the conversion are cached.

In step S125, the number of y-direction repetitions Hy for the output corresponding to the currently targeted input pixel data is calculated. Like the above-described W and H, Hy can be calculated using a nearest neighbor scaling method. Note that the total Hy for y=1 to y=7 is H.

As a specific example of settings values, in a case that the MCU has been resized to 16×16 pixels using the nearest neighbor method, an item of color processing cache data is applied to a 16×2 pixel region. Hence, Hy=2 for all y.

In steps S126 and S127 (and steps S129 and S130), loop processes corresponding in number to the number of pixels in the y-direction and the x-direction are executed to output resized data. In step S128, the color processing cache data obtained using the processing up to and including step S124 is outputted as resized color separated data to the W×Hy size rectangular region with top-left pixel coordinates (0, Sy). In step S131, Hy is added to Sy to update the output position for the resized color separated data.

According to the processing shown in FIG. 18, it is possible to reduce the number of executions of the color space conversion processing and the color separation processing for the 8×8 pixels to one per row of pixels, i.e. a total of eight times, by making use of the properties of "pattern C". As a result, fast color separation processing with fewer calculations and memory accesses can be realized.

Furthermore, processing with fewer memory accesses than the processing in the above-described first exemplary embodiment can be realized. This is because, rather than performing the scaling after first storing the color separated data for the 8×8 pixels in the memory 1014, the data cached in step S124 is outputted directly as the resized color separated data.

For the sake of convenience, the case in which calculations are performed for the leftmost column of pixels is described. However, color conversion may be implemented on pixels extracted from another position, and the result cached.

The resized color separated data generation processing 4 (step S77) is explained with reference to FIG. 19.

Figure 19:
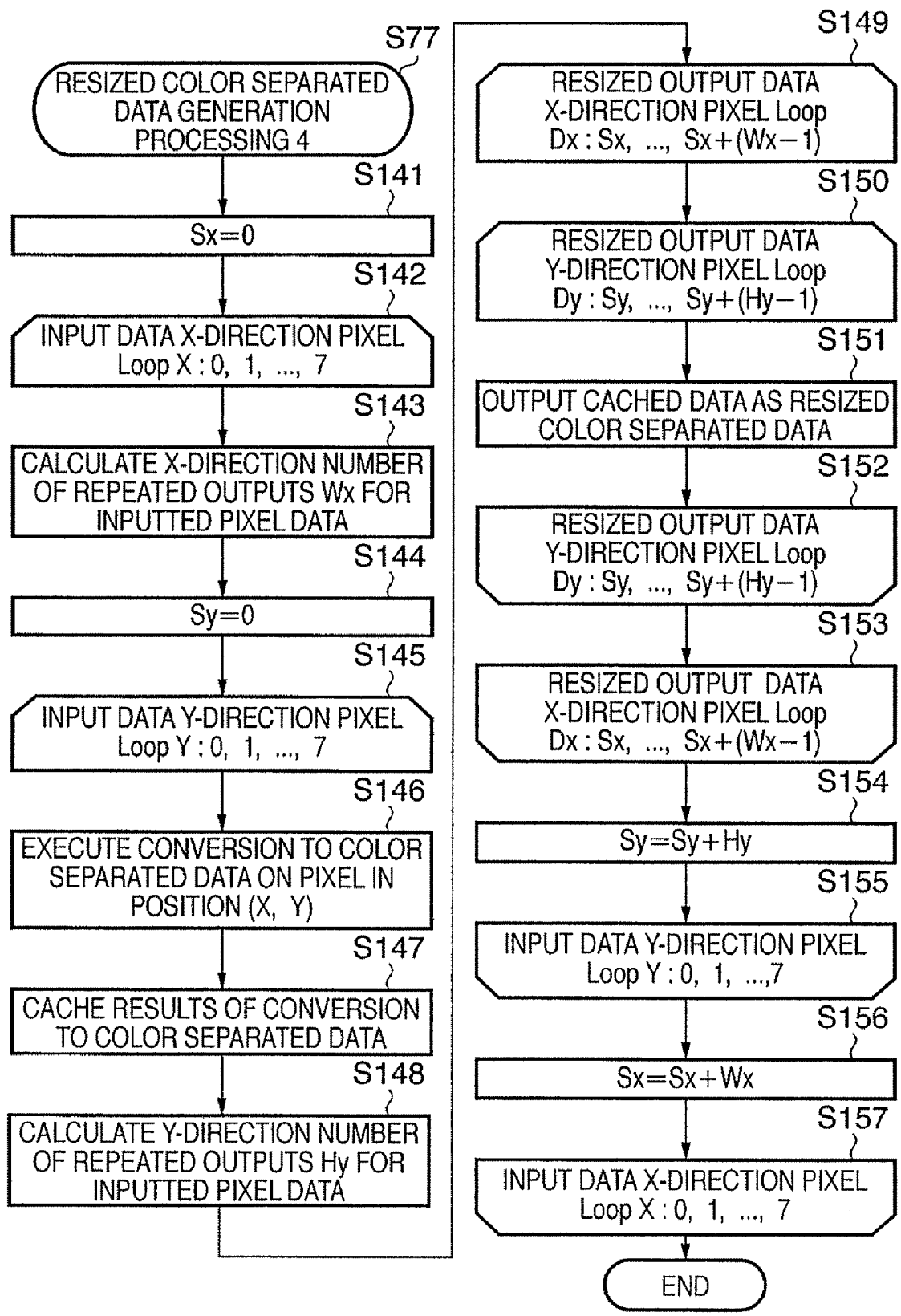
FIG. 19 is a flowchart describing generation processing 4 of resized color separated data corresponding to an MCU "pattern D" of the second exemplary embodiment.

FIG. 19 is a flowchart describing generation processing 4 of color separated data corresponding to an MCU of "pattern D" of the second exemplary embodiment. "Pattern D" differs from the other patterns in that there is no guarantee of continuity in the pixel values in both the x- and y-directions. Hence, it is necessary to execute color space conversion processing and color separation processing on all 8×8 pixels in the MCU, cache the results of the conversion, and take into account the scaling of each pixel when outputting.

FIG. 19 shows processing for the case when an 8×8 pixel MCU has been resized to a size of W×H pixels. The W×H size which results from scaling can be calculated using a scaling method such as the nearest neighbor method. Since such methods have no special content relevant to the second exemplary embodiment, a description of the scaling method has been omitted.

First, in step S141, a variable "Sx" is initialized to "0". The variable Sx corresponds to the variable of step S101 in the flowchart of FIG. 17. In step S142 and step S157, loop processing for the x-direction pixels of the input image data is executed.

In step S143, the number of x-direction repetitions Wx for the output of the currently targeted pixel data is calculated.

Like the above-described W and H, Wx can be calculated using a nearest neighbor scaling method. Note that the total of Wx for x=0 to x=7 is W.

The process then proceeds to step S144, and initializes a variable Sy to "0". The variable Sy corresponds to the variable of step S121 in the flowchart of FIG. 18. In step S145 and step S155), loop processing for the y-direction pixels of the input data is executed.

In step S146, the color space conversion processing and the color separation processing on the pixel data in position (x,y), which is the input data, are performed. Then, in step S147, the result of the conversion in step S146 is cached. In step S148, the number of y-direction repetitions Hy for the output of the currently targeted input pixel data is calculated. Like the above-described W and H, Hy can be calculated using a nearest neighbor scaling method. Note that the total Hy for y=0 to y=7 is H.

In steps S149 and S150 (and steps S152 and S153), loop processes corresponding in number to the number of pixels in the x-direction and the y-direction of the resized output data are executed. In step S151, the color processing cache data obtained using the processing up to and including step S147 is, after scaling, outputted as resized color separated data to the Wx×Hy size rectangular region with top-left pixel coordinates (Sx, Sy). Then, in step S154, Hy is added to Sy to update the output position in the y-direction for the resized color separated data. Similarly, in step S156, Wx is added to Sx to update the output position in the x-direction for the resized color separated data.

As described above, according to the processing of FIG. 19, it is possible to implement the processing in accordance with the properties of "pattern D". As described above, the number of executions of the color space conversion processing and the color separation processing cannot be reduced due to the properties of "pattern D". However, it is possible to realize processing with fewer memory accesses than the processing in the first exemplary embodiment. This is because, rather than performing the scaling after first outputting the color separated data for the 8×8 pixels to the memory 1014, the data cached in step S147 is outputted directly as the resized color separated data.

With the above-described processing, fast generation of the resized color separated data can be realized thanks to use of the DCT frequency characteristics of the MCU. Note also that the processes in FIG. 16 to FIG. 19 have the following advantages in common.

As is clear from the above description, the processes of FIG. 16 to FIG. 19 are realized using an arrangement in which only one item of color processing cache data is stored. This means that the size of the cache region can be minimized. As a result the technique can be realized at lower cost than techniques in which a plurality of items of color processing cache data are generated and stored in a cache data table.

Moreover, it is unnecessary to judge whether the color processing cache data should be applied. This is because the data pattern of the MCU is specified (as pattern A, B, C, or D) by the MCU classification data 520. Thus, for each data pattern, it is possible to specify how the color processing cache data should be generated and to which pixels the generated color processing cache data should be applied for each data pattern. As a result, the processing, necessary in conventional techniques, of judging whether color processing cache data is hit becomes unnecessary. This leads to a further improvement in speed.

Moreover, since the processing is performed with the MCU as the basic unit, the number of cache mishits generated between MCUs for the simple raster unit processing system can be reduced. This allows the number of generation operations of color processing cache data to be minimized.

The above described exemplary embodiments describe a system in which a host apparatus and the image processing apparatus are connected or a system in which a memory card is directly connected to the image processing apparatus. However, it goes without saying that the present invention can also be applied to systems constructed from a plurality of devices and to other systems which receive image data compressed using the DCT and generate print data from the inputted image data.

Further, it is to be understood that the object of the present invention may also be achieved by supplying a system or device with a storage medium (or recording medium) on which is stored a software program code for realizing the functions of the above-described exemplary embodiments. In this case, the object is achieved by the computer (or CPU, MPU or the like) of the device or system reading and executing the program code stored in the storage medium. It is then to be understood that the program code itself read from the storage medium realizes the functions of the above described embodiments and that the storage device with the program code stored thereon constitutes the present invention. Note that the functions of the above described exemplary embodiments need not be realized by the computer simply executing the read program code. Rather, an operating system (OS) or the like running on the computer may perform a part or all of processing to realize the functions of the above described exemplary embodiments based on instructions in the program code.

The functions of the above-described exemplary embodiment are also realized in cases such as the following. In such cases, the program code read from the storage medium is written to a memory provided in a function expansion card inserted into the computer or in a function expansion unit connected to the computer. The CPU provided with the function expansion card or function expansion unit then perform a part or all of the actual processing based on the instructions in the program code.

In the above-described exemplary embodiments, the description is limited to print data generation processing. However the present invention can be applied in any technique in which some sort of conversion processing, such as conversion of pixel units to another color space, is implemented on image data, such as JPEG data, which has been compressed using the DCT. For instance, the present invention may be applied in color matching processing or the like when displaying the JPEG images.

As described above, the exemplary embodiments allow a reduction in the amount of calculation and number of memory accesses in color processing on color image data compressed using the DCT, thereby enabling an increase in processing speed.

Like the above-described Japanese Patent Laid-Open No. 2001-145107, in the present exemplary embodiments, the processing load is reduced by paying close attention to the properties of the DCT coefficients. However, whereas efficiency improvements offered by the Japanese Patent Laid-Open No. 2001-145107 are limited to MCUs of uniform color, the present exemplary embodiments further realize efficiency improvements for MCUs of non-uniform color.

Moreover, in the present exemplary embodiments, the color processing caching can be realized at lower cost than in the techniques proposed in Japanese Patent Laid-Open No. 2005-53009. Only one group of calculation results is ever cached so there is no need to generate a cache data table.

Hence, the size of the cache region can be reduced, and the present exemplary embodiments excel in terms of cost.

In the present exemplary embodiments, since MCUs are classified into data patterns based on the DCT frequency properties, it is no longer necessary to search cache data tables and it is possible to realize favorable processing without use of wasteful processes.

Moreover, since the processing is performed with attention to the MCUs, the number of cache mishits generated between MCUs can be reduced, and the cache hit rate can be improved unlike the technique performing a simple rastering process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-336384, filed Dec. 13, 2006, which is hereby incorporated by reference herein in its entirety.

What is claimed is:

1. An image processing apparatus for processing compressed image data generated by segmenting image data into blocks and using a compression method which applies a frequency transformation to each block, the image processing apparatus comprising:
a decoder configured to decode the compressed image data and output decoded data;
a block classification unit configured to classify blocks according to frequency coefficients in the blocks decoded by the decoder; and
a color separated data generator configured to generate color separated data in block units based on the decoded data decoded by the decoder and a result of classification by the block classification unit,
wherein the block classification unit classifies the blocks as being at least one of
(a) a block A composed of only a DC component,
(b) a block B composed only of a DC component and horizontal frequency components, and
(c) a block C composed only of a DC component and vertical frequency components, and
wherein the color separated data generator generates color separated data for pixels of a single color in the block and outputs the generated color separated data for all pixels in the block, for a block classified as being block A,
the color separated data generator generates color separated data for a single stripe of pixels in the block and repeatedly outputs the generated color separated data in a column direction of the same pixel value of the block, for a block classified as being block B, and
the color separated data generator generates color separated data for a single stripe of pixels in the block and repeatedly outputs the generated color separated data in a row direction of the same pixel value of the block, for a block classified as being block C.

2. The image processing apparatus according to claim 1, wherein the color separated data generator uses the color separated data of an immediately preceding block of a current block, in a case that the current block and the immediately preceding block are classified as being block A.

3. The image processing apparatus according to claim 1, further comprising:
a quantization unit configured to perform quantization on the color separated data to generate print data.

4. The image processing apparatus according to claim 1, wherein the compressed image is a JPEG image and the block is an MCU (Minimum Coded Unit).

5. The image processing apparatus according to claim 4, wherein the decoder includes a Huffman decoder, an inverse quantization unit, and an inverse frequency transformation unit.

6. The image processing apparatus according to claim 1, wherein the color separated data generator includes:
a color space converter configured to convert the decoded data to a predefined color space; and
a color separator configured to perform device-specific color separation on color space conversion data generated by the color space converter.

7. The image processing apparatus according to claim 1, wherein the color separated data generator further includes a scaling unit configured to scale the color separated data.

8. The image processing apparatus according to claim 1, further comprising a scaling unit configured to resize the color separated data.

9. An image processing method for processing input compressed image data generated by segmenting image data into blocks and using a compression method to apply a frequency transformation to each block, the image processing method comprising the steps of:
decoding the compressed image and outputting decoded data;
classifying blocks according to frequency coefficients in the blocks decoded in the decoding step; and
generating color separated data in block units based on the decoded data and a result of classification in the classifying step,
wherein, in the classifying step, blocks are at least classified as being one of:
(a) a block A composed of only a DC component,
(b) a block B composed only of a DC component and horizontal frequency components, and
(c) a block C composed only of a DC component and vertical frequency components, and
wherein, in the generating step, for a block classified as being block A, color separated data for pixels of a single color in the block is generated and the generated color separated data for all pixels in the block is output,
in the generating step, for a block classified as being block B, color separated data for a single stripe of pixels in the block is generated and the generated color separated data in a column direction of the same pixel value of the block is repeatedly output, and
in the generating step, for a block classified as being block C, color separated data for a single stripe of pixels in the block is generated and the generated color separated data in a row direction of the same pixel value of the block is repeatedly output.

10. The image processing method according to claim 9, wherein in a case that a current block and an immediately preceding block are classified as being block A, in the generating step, the color separated data of the immediately preceding block of the current block is used.

11. The image processing method according to claim 9, further comprising the step of:
performing quantization on the color separated data to generate print data.

12. The image processing method according to claim 9, wherein the compressed image is a JPEG image and the block is an MCU (Minimum Coded Unit).

13. The image processing method according to claim 12, wherein the decoding step includes:

a Huffman decoding step;
an inverse quantization step; and
an inverse frequency transformation step.

14. The image processing method according to claim 9, wherein the generating step includes the steps of:
converting the decoded data to a predefined color space; and
performing device-specific color separation on color space conversion data generated in the converting step.

15. The image processing method according to claim 9, wherein the generating step further includes a step of scaling the color separated data.

* * * * *